US006209040B1

(12) United States Patent
Acton et al.

(10) Patent No.: US 6,209,040 B1
(45) Date of Patent: Mar. 27, 2001

(54) METHOD AND SYSTEM FOR INTERFACING TO A TYPE LIBRARY

(75) Inventors: Colin L. Acton, Kirkland; Ilan G. Caron, Redmond; Alan W. Carter, Bellevue, all of WA (US); Tom Corbett, Eugene, OR (US); Michael J. Woolf, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 07/959,056

(22) Filed: Oct. 9, 1992

(51) Int. Cl.[7] .................................................. G06F 9/00

(52) U.S. Cl. ............................................................ 709/315

(58) Field of Search .................................... 395/600, 700, 395/500, 62, 65, 703, 685, 614, 705, 701, 702, 704, 706, 707, 708, 709, 710; 364/978.2

(56) References Cited

U.S. PATENT DOCUMENTS

| 5,093,914 |   | 3/1992  | Coplien et al. ...................... 395/700 |
|-----------|---|---------|-----------------------------------------------|
| 5,146,593 |   | 9/1992  | Brandle et al. ...................... 395/700 |
| 5,206,951 | * | 4/1993  | Khoyi et al. ......................... 395/650 |
| 5,235,701 | * | 8/1993  | Ohler et al. .......................... 395/600 |
| 5,280,617 | * | 1/1994  | Brender et al. ...................... 395/703 |
| 5,307,499 | * | 4/1994  | Yin ....................................... 395/700 |
| 5,339,430 | * | 8/1994  | Lunden et al. ....................... 395/685 |
| 5,339,438 | * | 8/1994  | Conner et al. ....................... 395/700 |
| 5,361,350 | * | 11/1994 | Conner et al. ....................... 395/614 |
| 5,421,016 | * | 5/1995  | Connor et al. ....................... 395/700 |
| 5,428,792 | * | 6/1995  | Connor et al. ....................... 395/700 |
| 5,619,710 | * | 4/1997  | Travis et al. ......................... 395/800 |

FOREIGN PATENT DOCUMENTS

| 471 442 A2  | 2/1992 | (EP) .                   |
|-------------|--------|--------------------------|
| 0 546 794 A2| 8/1992 | (WO) ............... G06F/9/44 |

OTHER PUBLICATIONS

Sebesta; *Concepts of Programming Languages;* Benjamin/Cummings Publishing Co.; 1992.*
Silbershatz, et al.; *Operating System Concepts;* Addison–Wesley Pub. Co., Inc.; 1994 (4th Ed.)*
Object–Oriented Software Construction: Bertrand Meyer, Prentice Hall, 1988, pp. 183–217, 327–339, 67–103.*
Michael Kilian, "Trellis: turning designs into programs", Communication of the ACM, vol. 33, No. 9, pp. 65–67; Sep. 1990.*
Jiri Soukup, "Organized C: A unified method of handling data in CAD algorithms and databases", ACM/III design automation conference, pp. 425–430, 1990.*
Agrawal et al, "Static type checking of multi–methods", OOPSLA '91, pp. 113–128.*
Borland, Turbo Pascal Turbo Vision Guide, version 6, chapters 3, 9, 1990.*
Shannon et al, "Mapping the Interface Description Language Type Model Into C" IEEE Transactions on Software Eng., V15,N(11) pp. 1333–1346, Nov. 1989.*

(List continued on next page.)

*Primary Examiner*—Majid Banankhah
*Assistant Examiner*—P. G Caldwell
(74) *Attorney, Agent, or Firm*—Klarquist Sparkman Campbell Leigh & Whinston, LLP

(57) ABSTRACT

A method and system for interfacing to type libraries are provided. In a preferred embodiment, the present invention defines an interface to a type library. The interface has a plurality of interface methods through which type information can be stored in and retrieved from the type library. A plurality of implementations of the defined interface are provided. A computer program is compiled using the defined interfaces to access the type information. When the compiled computer program is executed, it accesses the type information using one of the plurality of implementations. In a preferred embodiment, a type library contains type information to allow a compiler to bind to an instance of type at compile type (early binding).

10 Claims, 13 Drawing Sheets

OTHER PUBLICATIONS

Meyers, Randall, "The Interaction of Pointers to Members & Virtual Base Classes in C++", USENIX, 1991, pp. 1–11.*

Shaw, Richard, "A Preview of Microsoft C/C++ & The Microsoft Foundation Classes for Windows", *Microsoft Systems Journal,* Mar./Apr. '92, V7, N2 p. 43(13).*

M$^c$Cluskey, Glen, "An Environment for Template Instantation" *CH Report,* V4, N2, Feb. '92 pp. 3–7.*

Ravindran et al, "Reliable Client Server Communication in Distributed Programs" Local Computer Networks, Oct. 10–12, 1989 pp. 242–251.*

Cole, Robert, "Application Configuration in a Client Server Distributed System", IEE, 1992 pp. 309–317.*

*Inside Macintosh,* vol. VI, Addison–Wesley Publishing Company, 1991, Chapter 6, "The Apple Event Manager," pp. 6–1 to 6–117.

Meyer, "Object–oriented Software Construction," *Interactive Software Engineering and Societe des Outils du Logiciel,* Prentice Hall, ch. 9, 14, 15 and 5 (1988).

* cited by examiner

METHOD AND SYSTEM FOR INTERFACING TO A TYPE LIBRARY

DESCRIPTION

1. Technical Field

This invention relates generally to a computer method and system for storing type information, and in particular, a method and system for storing type information in a language-independent manner.

2. Background of the Invention

The use of object-oriented programming techniques can facilitate the development of complex computer programs. Programming languages that support object-oriented techniques have been developed. One such programming language is C++. The C++ programming language is described in "The C++ Language Reference," published by Microsoft Corporation, which is hereby incorporated by reference.

Two common characteristics of object-oriented programming languages are support for data encapsulation and data type inheritance. Data encapsulation refers to the coupling of data to the functions that operate on the data. Inheritance refers to the ability to define a data type as an extension of other data types. An instance of a data type that couples data and functions is referred to as an "object."

An object is a run time structure for a user-defined type (a class type) that may contain data members and function members. Each class has a class definition that specifies its data members and function members. Each object is declared to be a certain class type. In a preferred embodiment, the run time data structures of an object conforms to the model defined in U.S. patent application Ser. No. 07/682,537, now U.S. Pat. No. 5,297,284, entitled "A Method for Implementing Virtual Functions and Virtual Bases in a Compiler for an Object-Oriented Programming Language," which is hereby incorporated by reference.

It is often useful for two computer programs to access the same instance of an object. For example, a first computer program instantiates an object in shared memory and notifies a second computer program of the location of the object. The second computer program then accesses the object in shared memory. However, to access the object, the second computer program needs to be written and compiled with the class definition of the object. Without the class definition, the second computer program would not know how to access the data members and function members of the object. Thus, a computer program is written and compiled with the class definition for each object it wishes to share with another computer program.

When the developer of a computer program wishes to allow other computer programs to access its objects, the developer publishes the class definitions of the objects. The developers of other computer programs could then incorporate the published class definitions into their computer programs. One skilled in the art would appreciate that this publication may use a "header" file containing the class definitions. The developers of other computer programs could then write their computer programs to access objects defined in the header file and "include" the header file in the source code for the computer programs. The source code is then compiled and is ready to access the object.

Because prior methods require that a class definition be available when developing a computer program, there has been limited sharing of objects between computer programs developed by independent developers. This limited sharing occurs because, for example, it is difficult to distribute class definitions to independent developers, who may be located throughout the world, in a timely manner. Similarly, it is difficult to distribute updates to the class definition and difficult for the developers to integrate these updates and distribute updated versions of the computer programs to users. These difficulties are compounded when a computer program incorporates class definitions provided by several developers. Also, because there is no standard programming language, it can be difficult to adapt a class definition in one programming language to another.

SUMMARY OF THE INVENTION

It is an object of the present invention to provide a system for storing and accessing information defining user-defined types.

It is another object of the present invention to provide a system for storing and accessing information for binding to objects.

It is another object of the present invention to provide a system for storing and accessing information for loading class definitions.

It is another object of the present invention to provide a type library interface and implementation for storing and accessing, defining, binding, and loading information relating to objects such that objects instantiated by one computer program can be accessed at run time by a second computer program without need for the second computer program to be compiled with the class definitions at compile time.

It is another object of the present invention to provide language-independent, implementation-indepdendent pre-compiled type definitions.

These and other objects, which will become apparent as the invention is more fully described below, are obtained by an improved method and system for interfacing to type libraries that store type information. In a preferred embodiment, the present invention defines an interface to a type library. The interface has a plurality of interface methods through which type information can be stored in and retrieved from the type library. A plurality of implementations of the defined interface are provided. A computer program is compiled using the defined interfaces to access the type information. When the compiled computer program is executed, it accesses the type information using one of the plurality of implementations. In a preferred embodiment, a type library contains type information to allow a compiler to bind to an instance of type at compile time (early binding).

BRIEF DESCRIPTION OF THE DRAWINGS

FIG. 5 is a block diagram showing the hierarchy of an ITypeMembers object.

FIG. 6 is a block diagram showing the hierarchy of an IFuncDesc object.

FIG. 7 is a block diagram showing the hierarchy of an ITypeDesc object.

DETAILED DESCRIPTION OF THE INVENTION

The present invention provides a method and system for a computer program to make its objects (data members and function members) accessible to other computer programs that are developed independently of the computer program. In a preferred embodiment, information defining the type of the objects that are accessible is stored in a "type library." A type library "exposes" to the applications the accessible objects of the computer program. A type library also contains binding information about the exposed objects. The binding information includes information needed by applications, such as compilers or interpreters, to bind to data and function members of the exposed objects. Binding information includes the offsets of data members within instance data and offsets of pointers to function members within virtual function tables. A type library preferably also contains loading information. The loading information includes information needed by applications, such as loaders, to determine the address of global functions and variables. A type library also preferably contains documentation describing the types defined in the library, which alternatively may include references to a help file containing more detailed information. An application accesses the objects of the computer program based on information in a type library.

The present invention provides interfaces (defined below) to a type library through which a developer of a computer program stores type definitions and through which an application retrieves the type definitions. Type definitions, binding information, and loading information for objects to be exposed are stored by instantiating type library interface objects and invoking the function members. An application accesses the exposed objects by instantiating type library interface objects and invoking the function members. The term "application" refers to code that is exposed to the computer program objects. The code can either execute in the same process or in a separate process from the computer program.

An interface is an abstract class which contains only pure virtual function members, that is, the class has no data members and no non-virtual function members. The function members of an interface are typically semantically related. Table 12 illustrates an interface for the class ISample.

TABLE 12

```
class ISample
{   public:virtual RETCODE func0( ) = 0;
    virtual RETCODE func1( ) = 0;
    virtual RETCODE func2( ) = 0;
}
```

Figure 13:
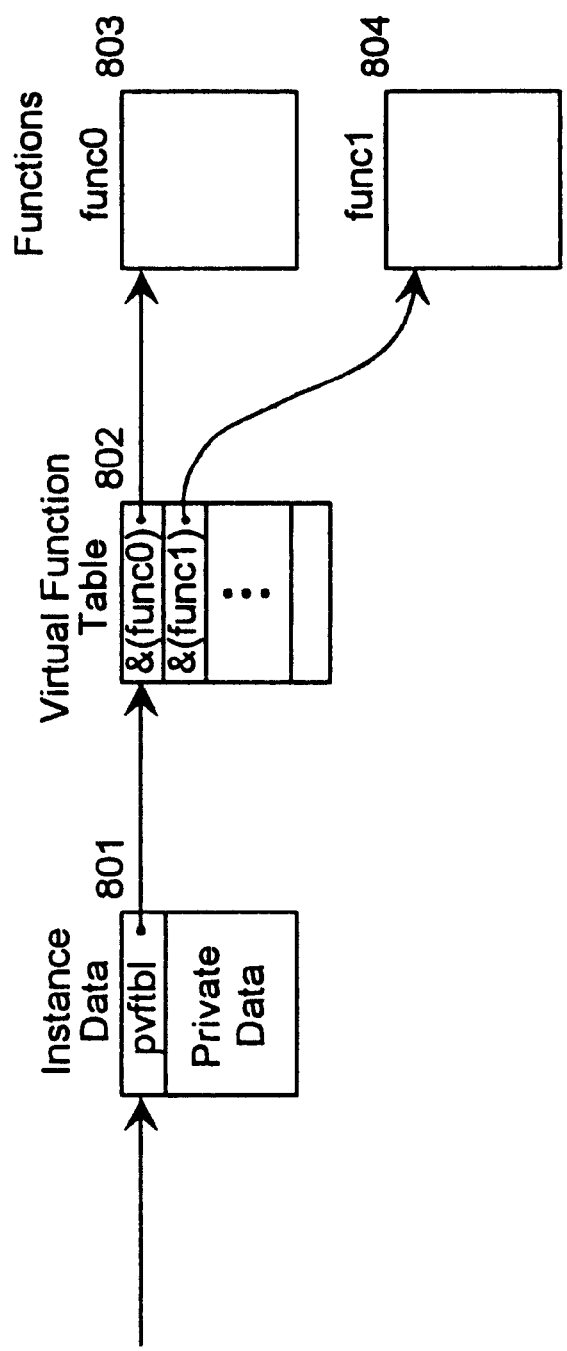
FIG. 13 is a block diagram showing the general structure of an interface object.

An interface provides an implementation-independent mechanism defining access to an instance of an implementation of the interface, referred to as an interface object. An interface object is a data structure that provides access to the function members of the interface. FIG. 13 is a block diagram showing the general structure of an interface object. An interface object comprises instance data 1301, virtual function table 1302, and functions 1303, 1304. The instance data 1301 contains a pointer to the virtual function table and private data that is not accessible only to the function members of the interface object. The virtual function table 1302 contains the address of each virtual function defined by the interface. The functions 1303, 1304 contain the code that implements the interface.

Figure 1:
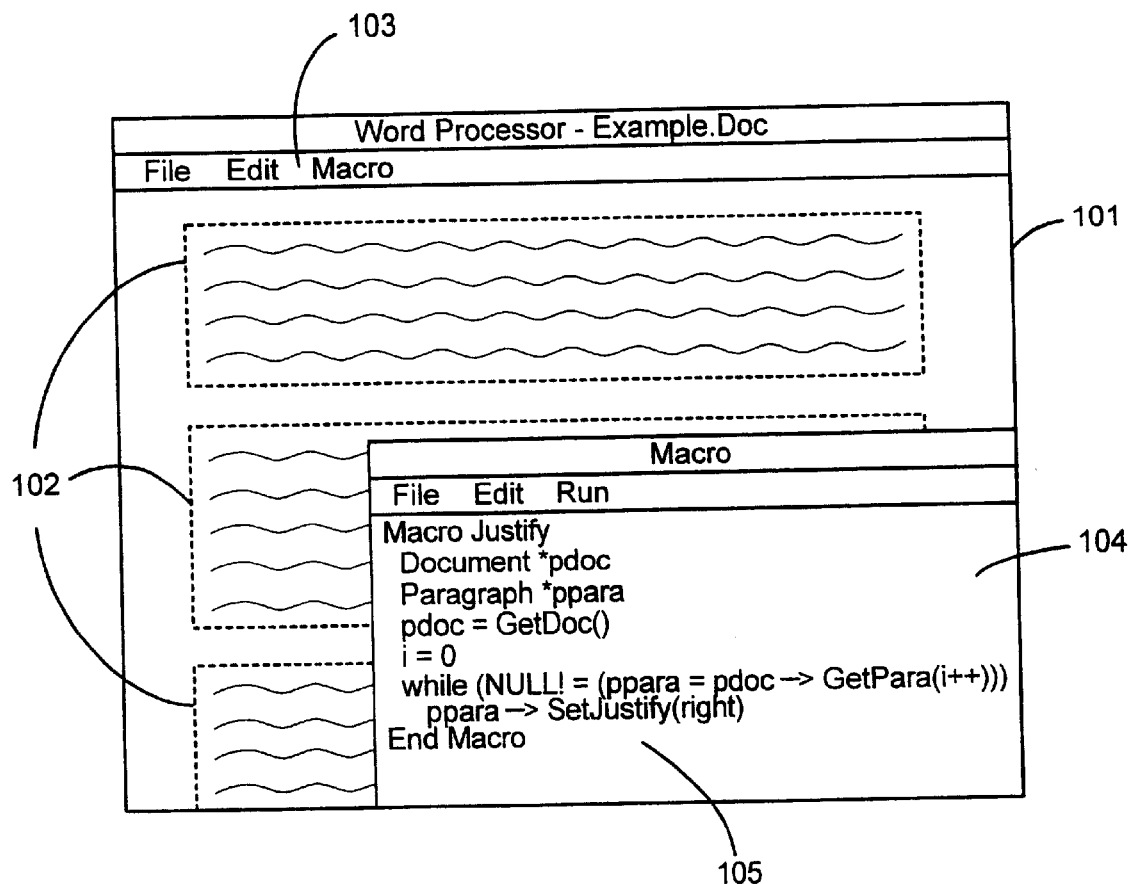
FIG. 1 is a screen layout showing a sample computer program and application that use a type library.

The following example illustrates the generation of a type library and the use of the type library by an application. FIG. 1 is a screen layout showing a sample computer program and application that use a type library. The computer program is a word processor that interacts with a user through window 101. The word processor has opened a document named "example.doc" that contains several paragraphs 102. The word processor has menu 103 for invoking a macro interpreter (an application). In this example, the macro interpreter is designed to run as part of the same process of the invoking computer program. The macro interpreter inputs statements in a C++-like language from a user and interprets the statements. When the user selects the macro menu 103, macro window 104 is created. The user inputs the macro statements 105 and then selects the run menu of the macro window 104 to interpret the macro statements. In this example, the macro statements 105 cause each paragraph in the opened document to be right justified.

Continuing with the example, the developer of the word processor publishes a type library containing the type definitions, binding information, loading information, and documentation with the executable code of the word processor. The developer of the macro interpreter publishes a description of its C++-like language. The word processor and the macro interpreter are developed with no special knowledge of the other. That is, the word processor is developed knowing only that it needs to load a macro interpreter stored in a file of a predefined name and invoke that macro interpreter when the user selects its macro menu. Similarly, the macro interpreter is developed knowing only that it needs to look to the type library that it is passed when invoked to access the exposed objects of the invoking computer program. The same macro interpreter can be invoked by other kinds of computer programs, such as a spreadsheet or database program. A user uses the documentation of the type definitions of the exposed word processor objects and the published definition of the language of the macro interpreter to develop macros for the word processor. The macro interpreter inputs these macros and interacts with the word processor based on the information in the word processor type library to interpret the macros.

Figure 2:
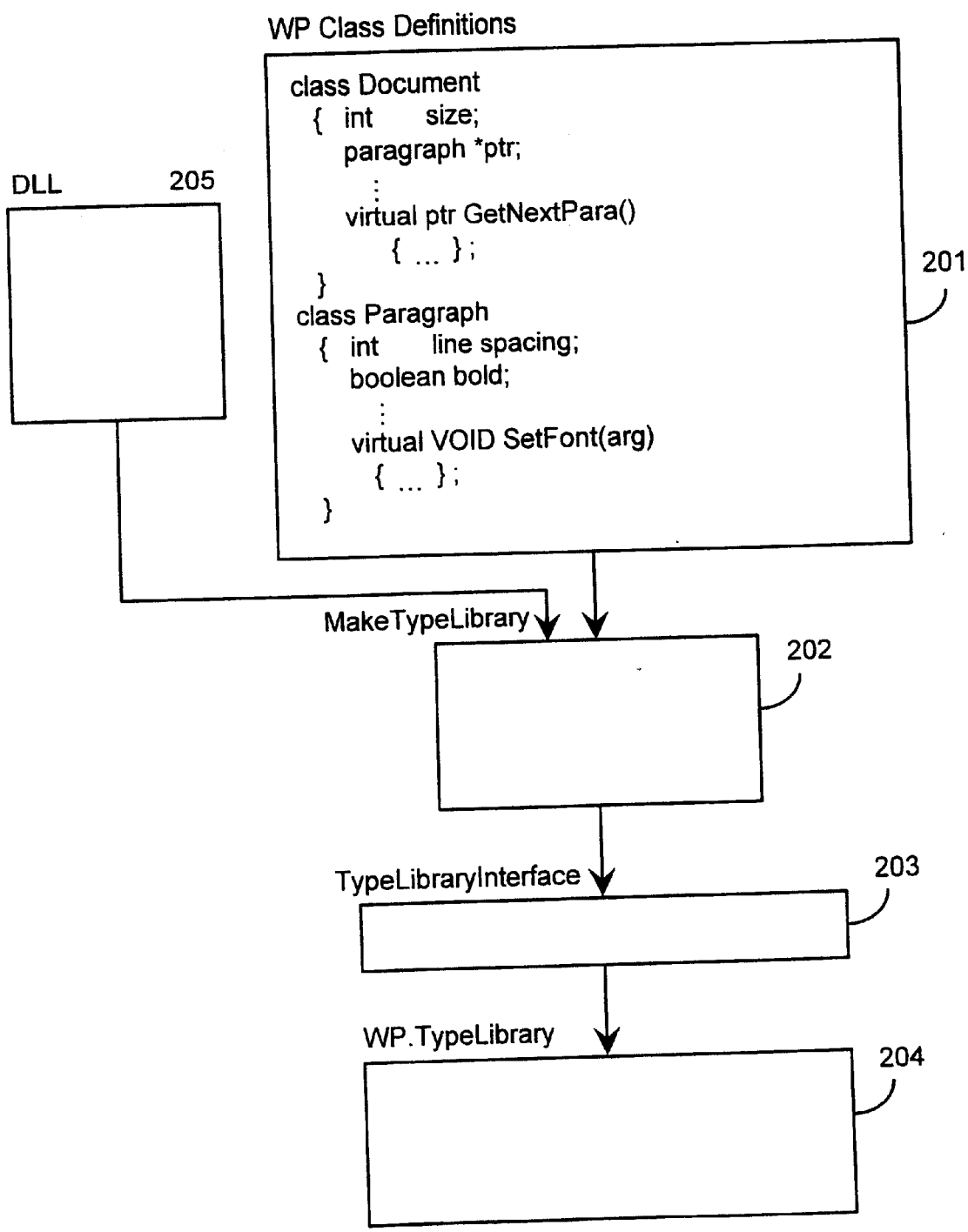
FIG. 2 is a block diagram showing the generation of a type library.

FIG. 2 is a block diagram showing the generation of a type library. To generate a type library, a "make type library" program 202 inputs a definition 201 of the type of objects that the word processor exposes along with loading information contained in a dynamic link library 205 and uses the type library interface 203 to generate the type library 204. The dynamic link library 205 contains the compiled global functions and the function members that are defined in the definition 201. The make type library program 202 adds the object type definitions to the type library and adds loading information derived from the dynamic link library 205. The program then "compiles" the definitions to generate binding information.

Figure 3:
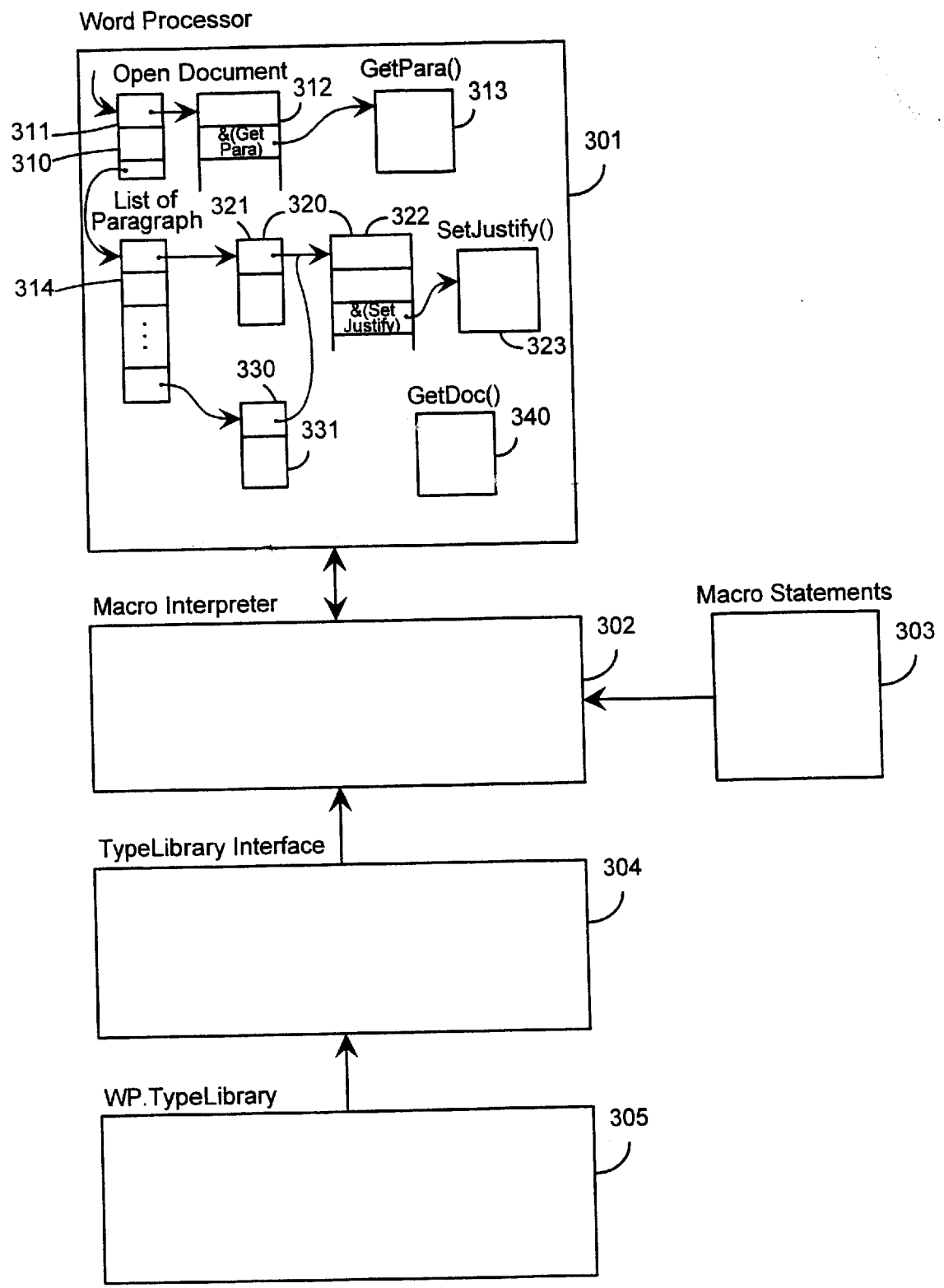
FIG. 3 is a block diagram showing sample components used when a word processor invokes a macro interpreter.
Figure 4:
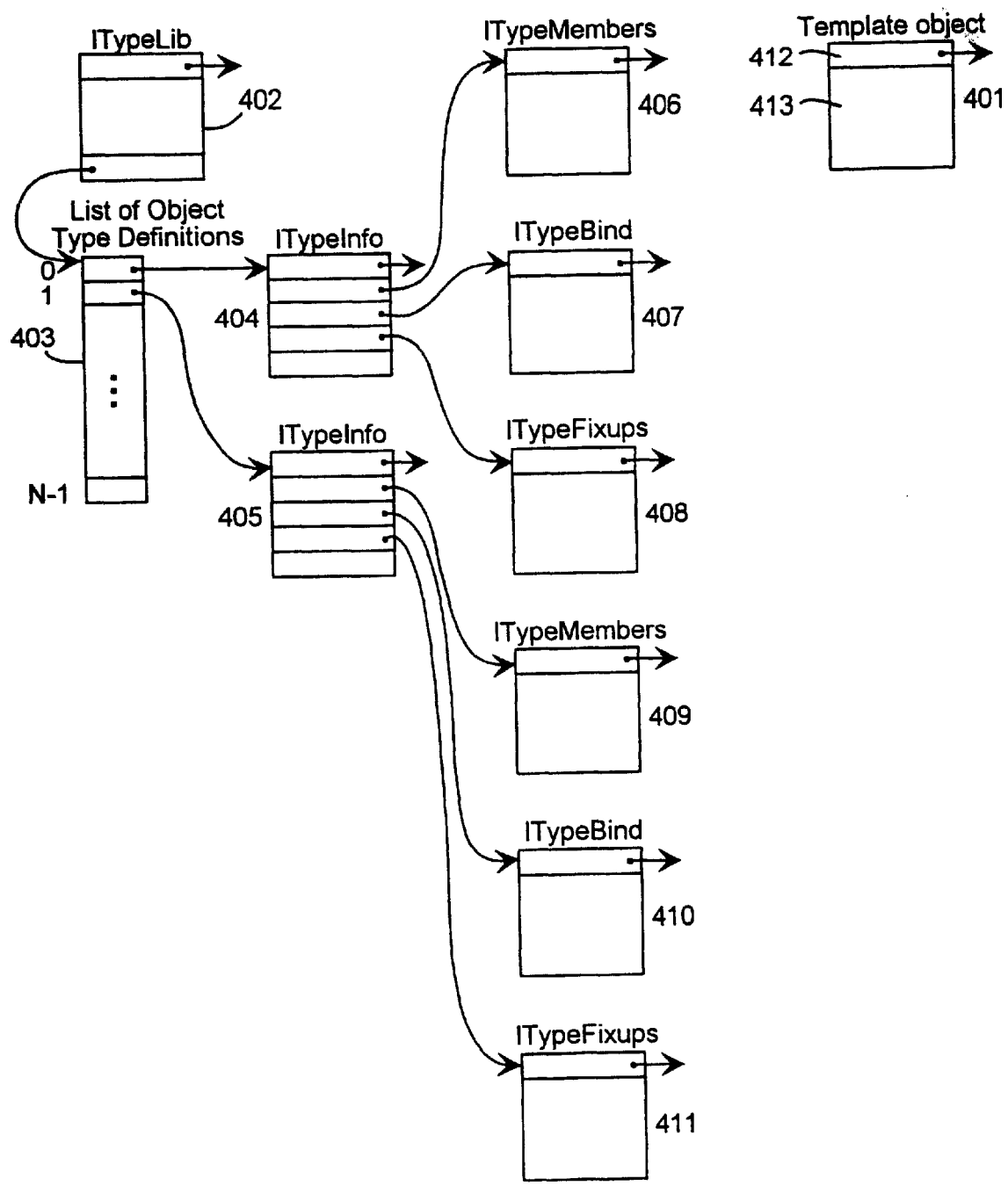
FIGS. 4 through 7 are block diagrams illustrating a preferred type library interface hierarchy.

FIG. 3 is a block diagram showing the components used when the word processor invokes the macro interpreter.

When a user selects the macro menu of the word processor 301, the word processor loads the macro interpreter code 302 in the address space of the word processor 301. In an alternate embodiment, the macro interpreter 302 could be loaded as a separate process and could use standard inter-process communication mechanisms to communicate with the word processor 301. Once the macro interpreter is invoked, the user then inputs macro statements 303. The macro interpreter 302 instantiates type library interface objects 304 to access the information in the word processor type library 305. In this example, the word processor 301 exposes objects of type "document" class and "paragraph" class. In this example, the document object 310 contains instance data 311 and a virtual function table 312. The virtual function table 312 contains pointers to the code that implements the virtual function members of the document class (e.g. GetPara() 313). The function member GetPara returns to the caller a pointer to the paragraph of the designated index within the open document. The instance data 311 contains a pointer to virtual function table 312 and a pointer to a list of paragraphs 314 in the document. The paragraphs are sequentially ordered by index starting at 0. The list of paragraphs 314 contains pointers to the paragraph objects 320, 330, which contain the text and properties (e.g., justification) of the paragraphs. The word processor instantiates a paragraph object for each paragraph in the document. Each paragraph object contains instance data 321 and virtual function table 322. The virtual function table 322 contains pointers to the code that implements the virtual function members of the paragraph class (e.g. Setjustify() 323). The function member SetJustify sets the paragraph to the designated justification. The word processor also exposes global function GetDoc 340. As its name suggests, the function GetDoc returns to the caller a pointer to the document object for the currently open document.

CODE TABLE 1

```
  Macro Justify
1 Document *pdoc
2 paragraph *ppara
3 pdoc = GetDoc( )
4 i = 0
5 while (NULL != (ppara = pdoc->GetPara(i++))
6   ppara->SetJustify("right")
  EndMacro
```

Code Table 1 lists macro statements that set the justification of each paragraph in the open document. The numbers to the left of the statements are for reference. In line 1, the macro declares the variable pdoc to point to a document object. In line 2, the macro declares the variable ppara to point to a paragraph object. In line 3, the macro sets the variable pdoc to point to the document object for the open document. The function GetDoc returns the pointer to the document object. In line 4, the macro sets the variable i to 0. The variable i is used to index through the paragraphs. In lines 5 and 6, the macro loops through each paragraph setting its justification to right justified. The function member GetPara of the document class returns as its value a pointer to the paragraph indexed by its parameter. If the parameter is greater than the number of paragraphs in the open document, then the function return value is set to NULL. The function member SetJustify of the paragraph class sets the paragraph to right justified. The steps that the macro interpreter performs to interpret the macro of Code Table 1 are described in detail below.

Type libraries can also be used to allow an application to create instances of objects defined in the type libraries. For example, a type library can provide a function CreateInstance that creates an instance of a designated type and returns a pointer to the instantiated object. The application can then access the object. The macro interpreter of the above example could instantiate an object a type paragraph, store data in the object using its methods, and use a method of the document object to add the paragraph object to the document.

Type Library Interfaces

The type library interfaces provide a mechanism for defining and accessing object type information, binding information, and loading information. In a preferred embodiment, the type library interfaces include the following interfaces:

ITypeLib

ITypeInfo

ITypeBind

ITypeFixups

ITypeMembers

IVarInfo

ITypeDesc

IFuncInfo

IFuncDesc

IParamInfo

An implementation of each type library interface has a corresponding interface object. The type library interfaces are defined in a hierarchy.

FIGS. 4 through 7 are block diagrams illustrating the type library interfaces hierarchy. One skilled in the art would appreciate that the illustrated hierarchy represents a data structure layout of the interface objects in one implementation. Other data structure layouts could also be used. (Referring to FIG. 4, template interface object 401 represents the interface object layout used in FIGS. 4 through 7. Each interface object contains a virtual function table pointer 412, which points to the virtual function table containing pointers to the function members of the interface, and contains private data members 413.) At the root of the type library interfaces hierarchy is the ITypeLib interface object 402. Each type library has one ITypeLib interface object. (In the following, the term "ITypeLib interface object" is shortened to "ITypeLib object"). The ITypeLib object 402 contains a pointer to a list of pointers 403 to the object type definitions contained in the type library. The object type definitions are sequentially ordered starting from 0. Each pointer in the list points to an ITypeInfo object 404, 405. Each ITypeInfo object contains the definition and binding and loading information of one object type. Each ITypeInfo object contains a pointer to an ITypeMembers object 406, an ITypeBind object 407, and an ITypeFixups object 408.

Figure 5:
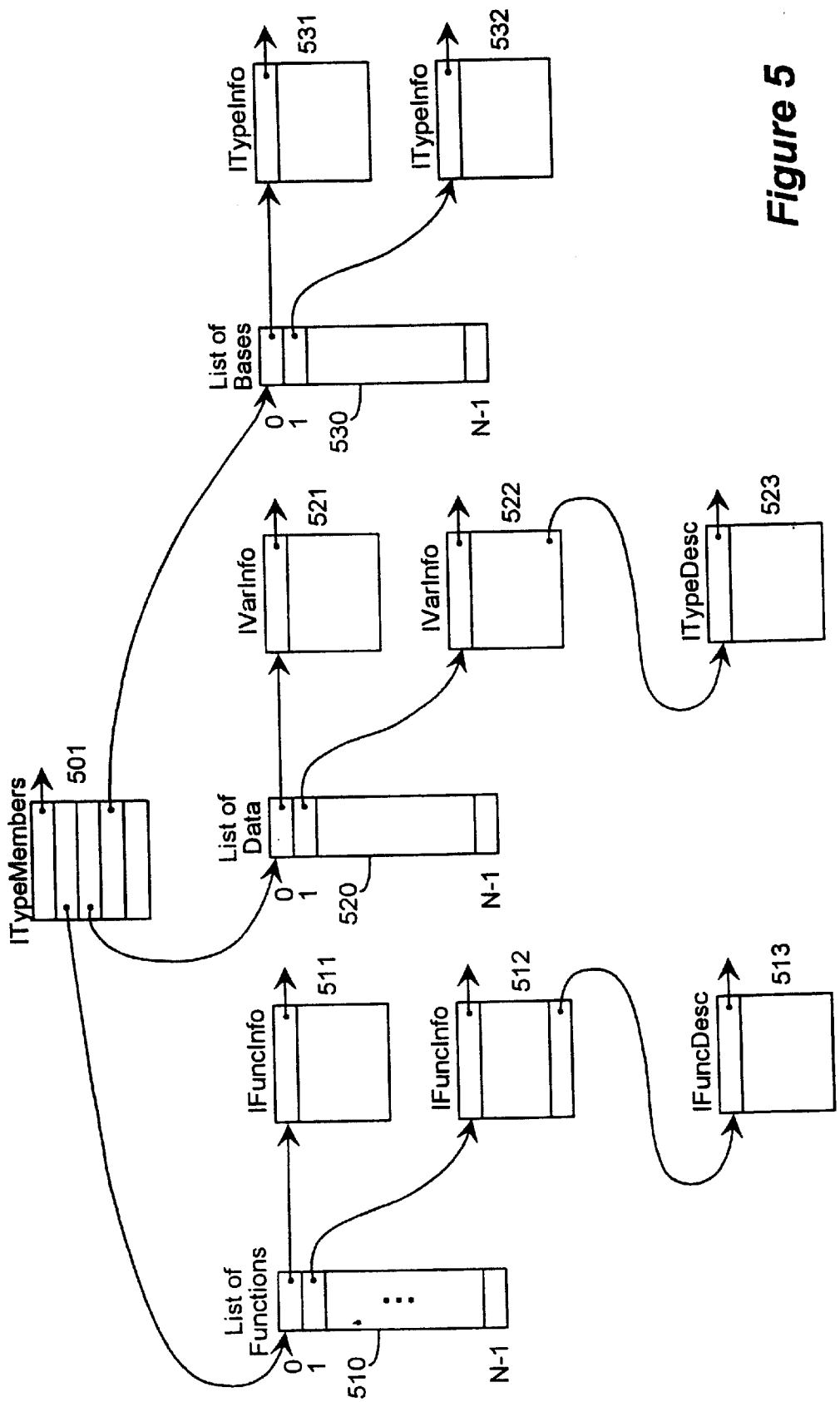

FIG. 5 is a block diagram showing the hierarchy below an ITypeMembers object. Each ITypeMembers object contains the definitions of the data members, function members, and base members of the container object type. The container object type for an interface object refers to the object type defined in the ITypeInfo object from which the interface object descends. An ITypeMembers object 501 contains pointers to three lists of pointers 510, 520, and 530. The list of pointers 510 contains pointers to the function member definitions of the container object type. The list of pointers 520 contains pointers to the data member definitions of the container object type. The list of pointers 530 contains pointers to the base class definitions of the container object type. In one embodiment, the present invention supports multiple inheritance. The function member definitions, data member definitions, and base member definitions are each sequentially ordered starting from 0. Each pointer to a function member definition points to an IFuncInfo object 511, 512. Each IFuncInfo object contains the definition of one function member of the container object type. Each IFuncInfo object contains a pointer to an IFuncDesc object 513, which defines the formal parameters of the function member. Each pointer to a data member definition points to an IVarInfo object 521, 522. Each IVarInfo object contains a definition of a data member or a base member. Each IVarInfo object 521, 522 contains a pointer to an ITypeDesc object 523, which defines the type of a data member. Each pointer to a base member definition points to an ITypeInfo object 531, 532, which define the type of the base members.

Figure 6:
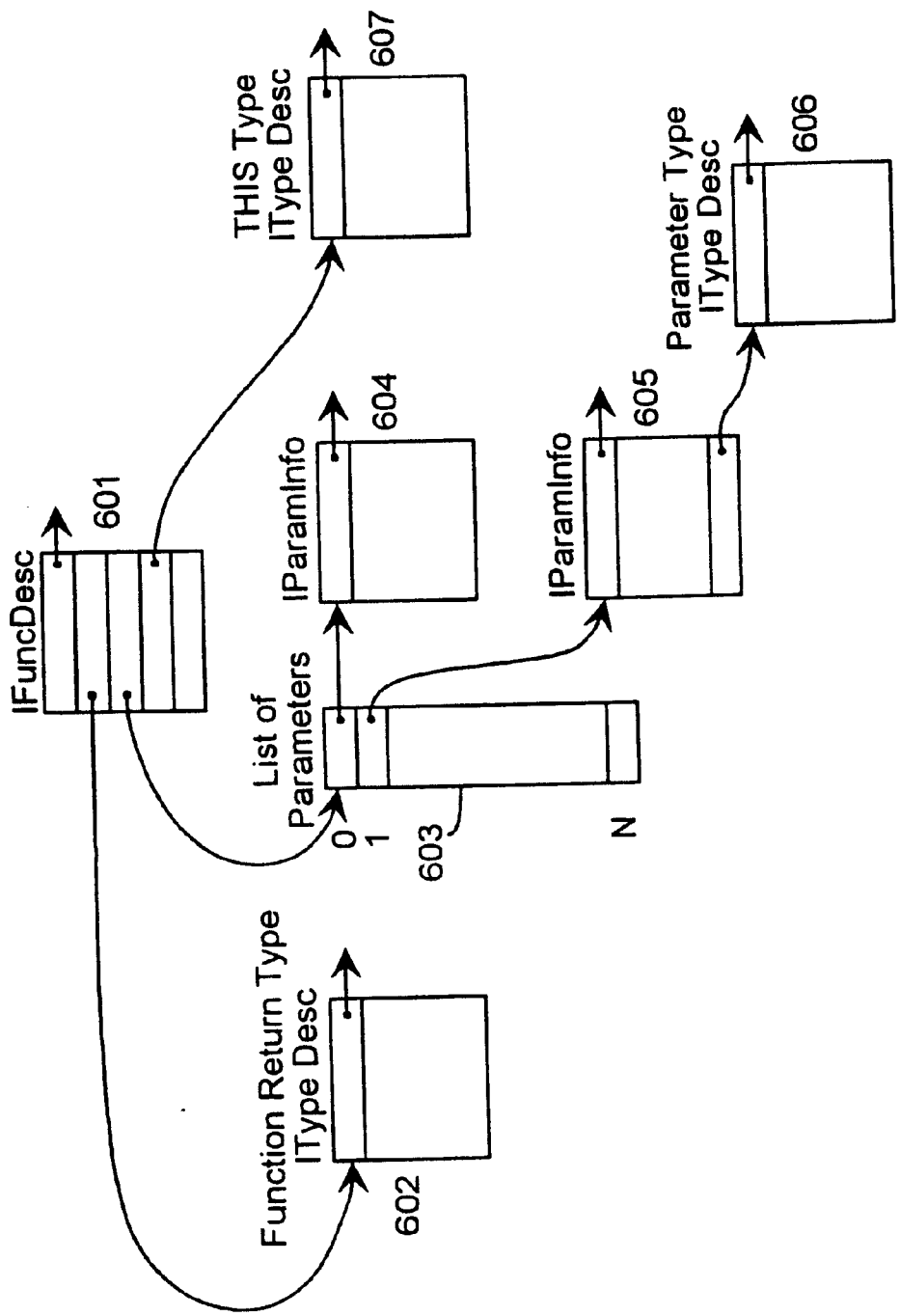

FIG. 6 is a block diagram showing the hierarchy below an IFuncDesc object. An IFuncDesc object 601 contains a pointer to an ITypeDesc object 602, which defines the return type of the function member; a pointer to a list of pointers 603 to the formal parameters of a function member; and a pointer to an ITypeDesc object 607, which defines the type of THIS pointer for the function member. Each IParamInfo object 604, 605 points to an ITypeDesc object 606, which defines the type of the formal parameter.

Figure 7:
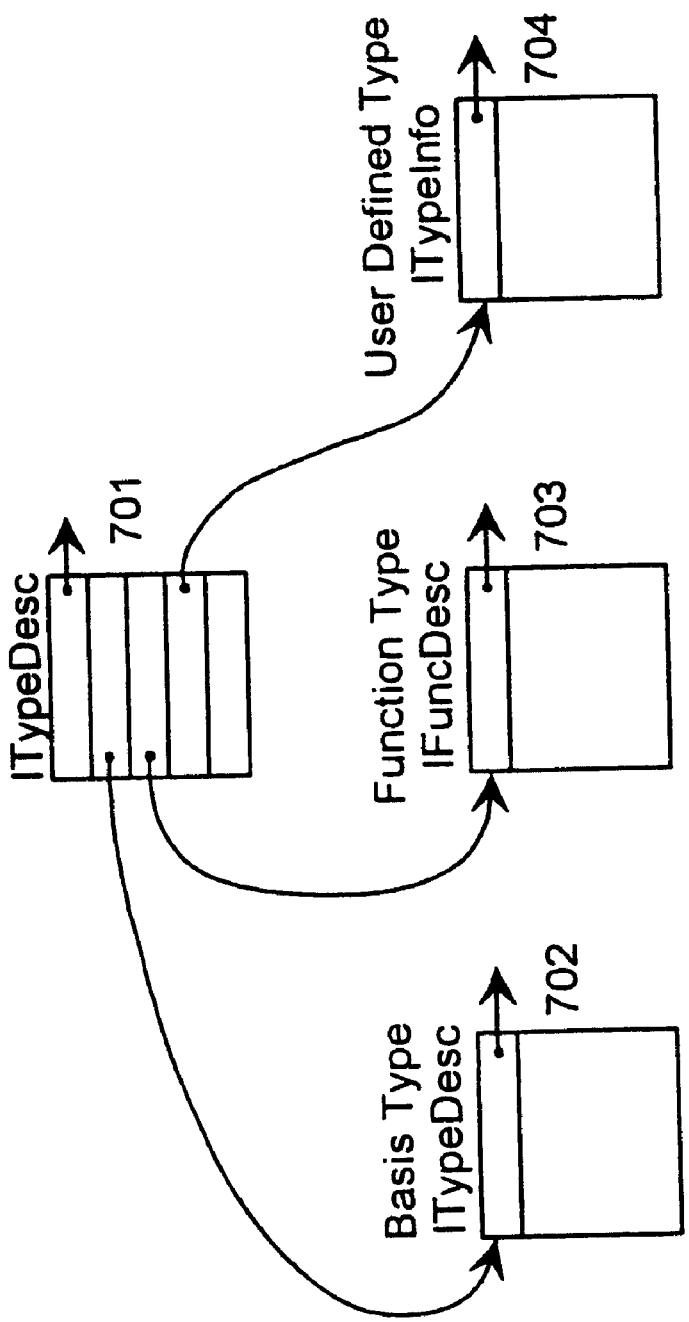

FIG. 7 is a block diagram showing the hierarchy below an ITypeDesc object. The ITypeDesc objects define the types of various components of an object type (e.g., data members, formal parameters, base members). An ITypeDesc object 701 optionally contains pointers to an ITypeDesc object 702, which defines the type of the basis (described below) of the component; to an IFuncDesc object 703, which defines the type of the function to which the component points; and to an ITypeInfo object 704, which defines a user-defined type.

Tables 1 through 11 define the type library interfaces. Each of the methods interfaces are described in detail in the following. The data members of an interface object may be stored and retrieved using methods. The methods that retrieve data are prefixed by "Get," and the methods that store data are prefixed by "Set." For example, the name of a type library is stored by the method ITypeLib::SetName, and is retrieved by the method ITypeLib::GetName. The parameters of the methods are named and typed in a manner to suggest the information passed as a parameter.

TABLE 1

```
class ITypeLib{
virtual    UINT GetTypeinfoCount( ) = 0
virtual    SCODE GetTypeInfo(UINT index, ITypeinfo** lplpitinfo) = 0;
virtual    SCODE GetDocumentation(BSTR* lpbstrDoc) = 0;
virtual    SCODE GetHelpFileName(BSTR*lpbstrFileName) = 0;
virtual    DWORD GetHelpContext( ) = 0;
virtual    SCODE GetTypeBind(ITypeBind** lplpitbind) = 0;
virtual    SCODE GetIndexOfName(LPSTR szName, WORD* pwindex) = 0;
virtual    SCODE GetFunctionId(LPSTR szFunctionName, BSTR* lpbstrFunctionId) = 0;
virtual    UINT GetFunctionIdCount( ) = 0;
virtual    SCODE GetFunctionIdOfIndex(UINT index, BSTR* lpbstrFunctionId) = 0;
virtual    SCODE GetName(BSTR* lpbstrName) = 0;
virtual    WORD GetLanguageCode( ) = 0;
virtual    SCODE GetTypeName(UINT index BSTR* lpbstr) = 0;
virtual    SCODE GetTypeDocumentation(UINT index, BSTR* lpbstrDoc) = 0;
virtual    SCODE SetDocumentation(LPSTR lpstrDoc) = 0;
virtual    SCODE SetHelpFileName(LPSTR lpstrFileName) = 0;
virtual    SCODE SetHelpContext(DWORD dwHelpContext) = 0;
virtual    SCODE SetName(LPSTR szName) = 0;
virtual    SCODE SetLanguageCode(WORD wLangCode) = 0;
virtual    SCODE AddTypeInfo(ITypeInfo* lptinfo, LPSTR szName) = 0;
virtual    SCODE RemTypeInfo(UINT i) = 0;
};
```

ITypeLib Interface

The ITypeLib interface defines the methods of an ITypeLib object. An application uses a function OpenTypeLibrary to open a type library of a designated name, to instantiate an ITypeLib object corresponding to the open type library, and to return a pointer to the instantiated ITypeLib object. The methods of an ITypeLib object provide the functionality to add and remove ITypeInfo objects, to store and retrieve descriptive information of the type library (e.g., help file, name of type library), to retrieve the ITypeInfo objects within the type library, and to retrieve binding and loading information for functions and data defined in the type library. Table 1 lists the ITypeLib interface.

In a preferred embodiment, a type library can store information defining a C++-like class, C++-like enumerators, and global functions and data.

ITypeLib::GetTypeInfoCount

The method GetTypeInfoCount retrieves the number of ITypeInfo objects contained in this ITypeLib object. (In the following, the term "this" before an interface object refers to the instance for which the method is invoked.) The method returns the number as its value. The number corresponds to the number of pointers in the list of object type definitions 403.

ITypeLib::GetTypeInfo

The method GetTypeInfo retrieves the ITypeInfo object of the designated index for this ITypeLib object. (In the following, the term "designated" refers to a parameter of the method.) The method returns a pointer to the retrieved ITypeInfo object as a parameter.

ITypeLib::GetDocumentation

The method GetDocumentation retrieves a string containing a brief description of this ITypeLib object. The string contains a description of this ITypeLib object and would typically be used by a "browser." A browser refers to an application that displays object type definitions within a type library to a user. For example, the macro interpreter of the above example could have a browsing mode in which it displayed the object type definitions of the word processor using the word processor or type library. The method returns a pointer to the retrieved string as a parameter.

ITypeLib::GetHelpFileName

The method GetHelpFileName retrieves a string containing the file name of a help file for this ITypeLib object. The help file contains information useful to provide assistance to users. The method returns a pointer to the retrieved string as a parameter.

ITypeLib::GetHelpContext

The method GetHelpContext retrieves the context for the help file for this ITypeLib object. The help context indicates a location within the help file of pertinent information. The method returns the retrieved help context as a parameter.

ITypeLib::GetTypeBind

The method GetTypeBind retrieves an ITypeBind object for this ITypeLib object. The method returns a pointer to the retrieved ITypeBind object as a parameter. The retrieved ITypeBind object allows an application to retrieve binding information for all global functions and global data within this ITypeLib object. Although the functionality of the retrieved ITypeBind object can be provided by instantiating all ITypeInfo objects within this ITypeLib object that have a type kind of MODULE (see below), this method allows a more efficient mechanism to be implemented.

ITypeLib::GetIndexOfName

The method GetIndexOfName retrieves the index of the ITypeInfo object of the designated name for this ITypeLib object. The method returns the retrieved index as a parameter.

ITypeLib::GetName

The method GetName retrieves the name of this ITypeLib object. The method returns the name as a parameter. The name is intended to be used by compilers that support accessing types defined with a type library. For example, the statement "WP:Document *pdoc" may indicate to the compiler that the type—"WP:Document"—is defined in a type library named "WP" as a type name "Document."

ITypeLib::GetLanguageCode

The method GetLanguageCode retrieves a language identifier for this ITypeLib object. The language identifier indicates the natural language (e.g., English, French) of the names and text in this ITypeLib object. The method returns the language identifier as its value.

ITypeLib::GetTypeName

The method GetTypeName retrieves the name of the ITypeInfo object of the designated index of this ITypeLib object. This method provides a mechanism for retrieving the object type names without loading the ITypeInfo object. The method returns the retrieved name as a parameter.

ITypeLib::GetTypeDocumentation

The method GetTypeDocumentation retrieves a string containing a description of the ITypeInfo object of the designated index of this ITypeLib object. This method provides a mechanism for retrieving object type documentation without loading the ITypeInfo object. The method returns the retrieved string as a parameter.

ITypeLib::SetDocumentation

The method SetDocumentation stores the designated string as the documentation for this ITypeLib object.

ITypeLib::SetHelpFileName

The method SetHelpFileName stores the designated string as the help file name for this ITypeLib object.

ITypeLib::SetHelpContext

The method SetHelpContext stores the designated help context as the help context for this ITypeLib object.

ITypeLib::SetName

The method SetName stores the designated string as the name of this ITypeLib object.

ITypeLib::SetLanguageCode

The method SetLanguageCode stores the designated code as the language code of this ITypeLib object.

ITypeLib::AddTypeInfo

The method AddTypeInfo adds the designated ITypeInfo object with the designated name to this ITypeLib object. An ITypeInfo object is created with the routine CreateTypeInfo (described below).

ITypeLib::RemTypeInfo

The method RemTypeInfo removes the ITypeInfo object of the designated index from this ITypeLib object.

In an alternate embodiment, each global function defined in a type library is assigned a unique function identifier. The ITypeLib interface provides methods through which information about a global function can be retrieved using the function identifier. Information can be retrieved more efficiently by using the function identifier rather than by using a string containing the function name.

TABLE 2

```
class ITypeInfo{
virtual    SCODE GetName(BSTR* lpbstrName) = 0;
virtual    SCODE GetTypeMembers(ITypeMembers** lplptmembers) = 0;
virtual    SCODE GetTypeBind(ITypeBind** lplptbind) = 0;
virtual    SCODE GetTypeFixups(ItypeFixups** lplptfixups) = 0;
virtual    TYPEKIND GetTypeKind( ) = 0;
virtual    SCODE CreateInstance(VOID** ppobject) = 0;
virtual    WORD GetLanguageCode( ) = 0;
virtual    SCODE GetDocumentation(BSTR* lpbstrDoc) = 0;
virtual    SCODE GetHelpFileName(BSTR* lpbstrFileName) = 0;
virtual    DWORD GetHelpContext( ) = 0;
virtual    ALIGNKIND GetAlignmentKind( ) = 0;
virtual    BOOL IsModifiable( ) = 0;
virtual    SCODE SetName(LPSTR lpstrName) = 0;
virtual    SCODE SetTypeKind(TYPEKIND typekind) = 0;
virtual    SCODE SetDocumentation(LPSTR lpstrDoc) = 0;
virtual    SCODE SetHelpContext(DWORD dwHelpContext) = 0;
virtual    SCODE SetAlignmentKind(ALIGNKIND alignkind) = 0;
};
```

ITypeInfo Interface

The ITypeInfo interface defines the methods of an ITypeInfo object. An ITypeInfo object points to an ITypeMembers object, an ITypeBind object, and an ITypeFixups object. Each of these pointed to objects provide a mechanism for different applications to access information needed by the application in an efficient way. For example, a browser may use an ITypeMembers object to display the definition of the container object type to a user. (A browser is an application that displays information in a type library to a user). A compiler or interpreter may use an ITypeBind object to retrieve the offsets of data members and function members. A loader may use an ITypeFixups object to determine the address of static data members and static function members of the container object type. Table 2 lists the ITypeInfo interface.

Each ITypeInfo object has a designated "type kind." In a preferred embodiment, the type kinds include ENUM, RECORD, MODULE, CLASS, ALIAS, and UNION. An ENUM type kind is a C++-like enumerator. A RECORD type kind is a C++-like class with no function members and no base members. A MODULE type kind is an aggregation of non-class functions and data. A CLASS type kind is a C++-like class. An ALIAS type kind is a C++-like type definition. A UNION type kind is a C++-like union.

ITypeInfo::GetName

The method GetName retrieves the name of the object type defined by this ITypeInfo object. The method returns the name as a parameter.

ITypeInfo::GetTypeMembers

The method GetTypeMembers retrieves the ITypeMembers object of the object type defined by this ITypeInfo object. When this method is called initially after this ITypeInfo object is instantiated, the retrieved ITypeMembers object is initialized so that its member lists are empty. The method returns a pointer to the retrieved ITypeMembers object as a parameter.

ITypeInfo::GetTypeBind

The method GetTypeBind retrieves the ITypeBind object instance of the object type defined by this ITypeInfo object. When this method is called initially after this ITypeInfo object is instantiated, the retrieved ITypeBind object is uninitialized. The method returns a pointer to the retrieved ITypeBind object as a parameter.

ITypeInfo::GetTypeFixups

The method GetTypeFixups retrieves the ITypeFixups object of the object type defined by this ITypeInfo object. When this method is called initially after this ITypeInfo object is instantiated, the retrieved ITypeFixups object is uninitialized. The method returns a pointer to the retrieved ITypeFixups object as a parameter.

ITypeInfo::GetTypeKind

The method GetTypeKind retrieves the type kind of the object type defined by this ITypeInfo object. The method returns the retrieved type kind as its value.

ITypeInfo::GetLanguageCode

The method GetLanguageCode retrieves a language identifier of the object defined by this ITypeInfo object. The language identifier indicates the natural language (e.g., English, French) of the text in this ITypeInfo object. The method returns the language identifier as its value.

ITypeInfo::CreateInstance

The method CreateInstance creates an instance of an object defined by this ITypeInfo object. This method returns an error if the type kind of the object defined by this ITypeInfo object is not CLASS. The method returns a pointer to the instantiated object.

ITypeInfo::GetDocumentation

The method GetDocumentation retrieves a string containing brief documentation describing the object type defined by this ITypeInfo object. The method returns the retrieved string as a parameter.

ITypeInfo::GetHelpFileName

The method GetHelpFileName retrieves a string containing the file name of a help file for the object type defined by this ITypeInfo object. The method returns the retrieved string as a parameter.

ITypeInfo::GetHelpContext

The method GetHelpContext retrieves the help context for the help file for the object type defined by this ITypeInfo object. The method returns the help context as a parameter.

ITypeInfo::GetAlignmentKind

The method GetAlignmentKind retrieves the alignment that should be used when instantiating an object of the object type defined by this ITypeInfo object. The method returns the alignment as its value.

ITypeInfo::IsModifiable

The method IsModifiable retrieves a flag that indicates whether the object type defined by this ITypeInfo object can be modified. An object type definition is made not modifiable, for example, to prevent users of a type library from modifying the definitions. The method returns the flag as its value.

ITypeInfo::SetName

The method SetName stores the designated name as the name of the object type defined by this ITypeInfo object.

ITypeInfo::SetTypeKind

The method SetTypeKind stores the designated type kind as the type kind of the object type defined by this ITypeInfo object.

ITypeInfo::SetDocumentation

The method SetDocumentation stores the designated string as the documentation of the object type defined by this ITypeInfo object.

ITypeInfo::SetHelpContext

The method SetHelpContext stores the designated help context as a help context of the object type defined by this ITypeInfo object.

ITypeInfo::SetAlignmentKind

The method SetAlignmentKind stores the designated alignment as the alignment for an object of the object type defined by this ITypeInfo object.

TABLE 3

```
class ITypeMembers{
virtual    SCODE GetTypeInfoContainer(ITypeInfo** lplptinfoContainer) = 0;
virtual    UINT GetFuncCount( ) = 0;
virtual    SCODE GetFunc(UINT index, IFuncInfo** lplpfinfoFunc) = 0;
virtual    UINT GetVarCount( ) = 0;
virtual    SCODE GetVar(UINT index, IVarInfo** lplpvinfoVar) = 0;
virtual    SCODE GetBase(ITypeInfo** lplptinfoBase) = 0;
virtual    VARTYPE GetVarTypeEnumImpl( ) = 0;
virtual    BOOL IsLaidOut( ) = 0;
virtual    SCODE GetTypeDescPvft(ITypeDesc** lplptdesc) = 0;
virtual    SCODE GetTypeDescAlias(ITypeDesc** lplptdesc) = 0;
virtual    SCODE GetMemberInfoOfHmember(HMEMBER hmember, IMemberInfo** lplpminfo = 0;
virtual    SCODE AddFunc(UINT index, IFuncInfo* lpfinfoFunc) = 0;
virtual    SCODE RemFunc(UINT index) = 0;
virtual    SCODE AddVar(UINT index, IVarInfo* lpvinfoVar) = 0;
virtual    SCODE RemVar(UINT index) = 0;
virtual    SCODE SetBase(ITypeInfo* lptinfoBase) = 0;
virtual    SCODE MakeLaidOut( ) = 0;
virtual    SCODE SetVarTypeEnumImpl(VARTYPE vt) = 0;
virtual    SCODE SetTypeDescPvft(ITypeDesc* lptdescPvft) = 0;
virtual    SCODE SetTypeDescAlias(ITypeDesc* lptdescAlias) = 0;
};
```

ITypeMembers Interface

The ITypeMembers interface defines the methods of an ITypeMembers object. As described above, an ITypeMembers object defines the base members, data members, and function members of the container object type. A complete hierarchy of an object type can be generated by recursively processing the type of the base members. Table 3 lists the ITypeMembers interface. The ITypeMembers interface defines a member handle that is used to identify a member within its container object type. The member handle provides a more efficient way of identifying a member than by using a string containing the member name.

ITypeMembers::GetTypeInfoContainer

The method GetTypeInfoContainer retrieves the ITypeInfo object which contains this ITypeMembers object. The method returns a pointer to the retrieved ITypeInfo object as a parameter. When an ITypeMembers object is created, its instance data contains an indication of the container ITypeInfo object. The method can be used to retrieve attributes of the type (e.g., its ITypeBind interface).

ITypeMembers::GetFuncCount

The method GetFuncCount retrieves the number of function members that are defined for the container object type defined by this ITypeMembers object. The method returns the retrieved number as its value.

ITypeMembers::GetFunc

The method GetFunc retrieves an IFuncInfo object defining the function member with the designated index of the container object type defined by this ITypeMembers object. This method returns a pointer to the retrieved IFuncInfo object as a parameter.

ITypeMembers::GetVarCount

The method GetVarCount retrieves the number of data members that are defined for the container object type defined by this ITypeMembers object. The method returns the number as its value.

ITypeMembers::GetVar

The method GetVar retrieves an IVarInfo object defining the data member with the designated index of the container object type defined by this ITypeMembers object. This method returns a pointer to the retrieved IVarInfo object as a parameter.

ITypeMembers::GetBase

The method GetBase retrieves a pointer to an ITypeInfo object defining the base member, if any. This method returns a pointer to the ITypeInfo object as a parameter.

ITypeMembers::GetVarTypeEnumImpl

The method GetVarTypeEnumImpl retrieves the integral type of enumerators defined by this ITypeMembers object. If the container object type defined by this ITypeMembers object is not an ENUM type kind, then the method returns an error, else the method returns the integral type as its value.

ITypeMembers::IsLaidOut

The method IsLaidOut retrieves a flag indicating whether the container object type defined by this ITypeMembers object has been successfully compiled. The compilation process generates the binding information such that applications can use the binding information to access objects of the container object type. The method returns the retrieved flag as its value.

ITypeMembers::GetTypeDescPvft

The method GetTypeDescPvft retrieves an ITypeDesc object that defines the type (e.g., constant, near, far, etc) of the virtual function table pointer of the container object type defined by the container object type defined by this ITypeMembers object. If the container object type has no primary virtual function table pointer, then the method sets the pointer to NULL. The method returns the retrieved pointer as a parameter.

ITypeMembers::GetTypeDescAlias

The method GetTypeDescAlias retrieves the ITypeDesc object that defines the type for which the container object type defined by this ITypeMembers object is an alias. If the container object type is not an ALIAS type kind, then the method sets the pointer to NULL. The method returns a pointer to the retrieved ITypeDesc object as a parameter.

ITypeMembers::GetMemberInfoOfHmember

The method GetMemberInfoOfHmember retrieves an IMemberInfo object defining the member with the designated member handle for the container object type defined by this ITypeMembers object. The method returns a pointer to the retrieved IMemberInfo object as a parameter.

ITypeMembers::AddFunc

The method AddFunc adds a copy of the designated IFuncInfo object defining a function member before the designated index in the list of function members of the container object defined by this ITypeMembers object. A new function may be appended by designating an index equal to the number of function members presently defined in the container object type.

ITypeMembers::RemFunc

The method RemFunc removes the IFuncInfo object with the designated index from the list of function members of the container object type defined by this ITypeMembers object. After removal, the indexes of the function members greater than the designated index are decremented.

ITypeMembers::AddVar

The method AddVar adds a copy of the designated IVarInfo object defining a data member before the designated index in the list of data members of the container object type defined by this ITypeMembers object. A new data member may be appended by designating an index equal to the number of data members presently defined in the container object type.

ITypeMembers::RemVar

The method RemVar removes the IVarInfo object with the designated index from the list of data members of the container object type defined by this ITypeMembers object. After removal, the indexes of the data members greater than the designated index are decremented.

ITypeMembers::SetBase

The method SetBase sets the base class to the designated ITypeInfo.

ITypeMembers::MakeLaidOut

The method MakeLaidOut compiles the container object type defined by this ITypeMembers object.

ITypeMembers::SetVarTypeEnumImpl

The method SetVarTypeEnumImpl stores the integral type of the enumerators of the container object type defined by this ITypeMembers object.

ITypeMembers::SetTypeDescPvft

The method SetTypeDescPvft stores the type of the virtual function table pointer of the container object type defined by this ITypeMembers object.

ITypeMembers::SetTypeDescAlias

The method SetTypeDescAlias stores the object type for which the container object type defined by this ITypeMembers object is an alias.

TABLE 4

```
class IMemberInfo{
virtual    SCODE GetName(BSTR* lpbstrName) = 0;
virtual    HMEMBER GetHMember( ) = 0;
virtual    SCODE GetDllEntry(BSTR* lpbstrFile, DWORD* lpdwDllOrdinal) = 0;
virtual    SCODE GetDocumentation(BSTR* lpbstrDoc) = 0;
virtual    DWORD GetHelpContext( ) = 0;
virtual    SCODE GetTypeInfoContainer(ITypeInfo** lplptinfo) = 0;
virtual    SCODE SetName(LPSTR szName) = 0;
virtual    SCODE SetHmember(HMEMBER hmemberVar) = 0;
virtual    SCODE SetDllEntry(LPSTR szFile, DWORD dwDllOrdinal) = 0;
virtual    SCODE SetDocumentation(LPSTR szDoc) = 0;
virtual    SCODE SetHelpContext(DWORD dwHelpContext) = 0;
};
```

IMemberInfo Interface

The IMemberInfo interface defines the methods of an IMemberInfo object. The IMemberInfo interface serves as a base class for the IVarInfo and IFuncInfo interfaces. The IMemberInfo interface defines characteristics that are common to data members, base members, and function members. Table 4 lists the IMemberInfo interface.

IMemberInfo::GetName

The method GetName retrieves the name of the member of the container object type defined by this IVarInfo or IFuncInfo object. The method returns the retrieved name as a parameter.

IMemberInfo::GetHmember

The method GetHmember produces the member handle for the member of the container object type defined by this IVarInfo or IFuncInfo object.

IMemberInfo::GetDllEntry

The method GetDllEntry retrieves the name of the dynamic link library (DLL) and ordinal in the DLL for the member of the container object type defined by this IVarInfo or IFuncInfo object, when the member has a DLL entry. Static data members and static function members have DLL entries. If the member has no corresponding entry in a DLL, the method sets the DLL file name to an empty string. The method returns the retrieved DLL file name and ordinal as parameters.

IMemberInfo::GetDocumentation

The method GetDocumentation retrieves a string containing a description of the member of the container object type defined by this IVarInfo or IFuncInfo object. The method returns the retrieved string as a parameter.

IMemberInfo::GetHelpContext

The method GetHelpContext retrieves the help context for the member of the container object type defined by this IVarInfo or IFuncInfo object. The help context is an index into the help file of the container ITypeInfo object. The help context is used to access detailed description of the member. The method returns the retrieved help context as a parameter.

IMemberInfo::GetTypeInfoContainer

The method GetTypeInfoContainer retrieves the ITypeInfo object that contains this IVarInfo or IFuncInfo object. The method returns a pointer to the retrieved ITypeInfo object as a parameter.

IMemberInfo::SetName

The method SetName stores the designated name as the name of the member of the container object type defined by this IVarInfo or IFuncInfo object.

IMemberInfo::SetHmember

The method SetHmember stores the designated member handle as the member handle of the member of the container object type defined by this IVarInfo or IFuncInfo object.

IMemberInfo::SetDllEntry

The method SetDllEntry stores the designated file name and designated ordinal as the file name and ordinal for the member of the container object type defined by this IVarInfo or IFuncInfo object.

IMemberInfo::SetDocumentation

The method SetDocumentation stores the designated string as documentation for the member of the container object type defined by this IVarInfo or IFuncInfo object.

IMemberInfo::SetHelpContext

The method SetHelpContext stores the help context for the member of the container object type defined by this IVarInfo or IFuncInfo object.

TABLE 5

```
class IVarInfo: Public IMemberInfo{
virtual    VARKIND GetVarKind( ) = 0;
virtual    SCODE GetTypeDesc(ITypeDesc** lplptdesc) = 0;
virtual    SCODE GetVal(VARIANT* lpvariant) = 0;
virtual    BOOL IsStatic( ) = 0;
virtual    BOOL GetOVar(LONG* lpvbpVar) = 0;
virtual    SCODE SetTypeDesc(ITypeDesc* lptdesc) = 0;
virtual    SCODE SetVal(VARIANT variant) = 0;
virtual    SCODE SetStatic(BOOL fStatic) = 0;
};
```

IVarInfo Interface

The IVarInfo interface defines the methods of an IVarInfo object. The IVarInfo interface inherits the IMemberInfo interface and provides a mechanism for defining data members, base members, and enumerators. The term "variable kind" indicates whether an IVarInfo object defines a base member, data member, or enumerator. The term "variable" refers to data member, base member, or enumerator. Table 5 lists the method introduced by the IVarInfo interface.

IVarInfo::GetVarKind

The method GetVarKind retrieves the variable kind that this IVarInfo object defines.

IVarInfo::GetTypeDesc

The method GetTypeDesc retrieves an ITypeDesc object that defines the object type of the variable defined by this IVarInfo object. The method returns a pointer to the retrieved ITypeDesc as a parameter.

IVarInfo::GetVal

The method GetVal retrieves a variant type when the variable defined by this IVarInfo object is a constant data member or an enumerator. The method returns the pointer as an argument. The method returns an error if the variable is not a constant data member or an enumerator.

IVarInfo::IsStatic

The method IsStatic retrieves a flag that indicates whether the variable defined by this IVarInfo object is static. The method returns the retrieved flag as its value. If the type kind of the container object type is MODULE, then the data member is preferably always static.

IVarInfo::GetOVar

The method GetOVar retrieves the offset from the start of the instance data of an object of the container object type for the variable defined by this IVarInfo object. This offset is only applicable to base members and non-constant data members. The method returns the offset as a parameter.

IVarInfo::SetTypeDesc

The method SetTypeDesc stores the type of the variable defined by this IVarInfo object.

IVarInfo::SetVal

The method SetVal stores the designated variant as the constant value for the variable defined by this IVarInfo object.

IVarInfo::SetStatic

The method SetStatic stores the designated flag as the static flag for the variable defined by this IVarInfo object.

TABLE 6

```
Class ITypeDesc{
  virtual    VARTYPE GetVarType( ) = 0;
  virtual    SCODE GetTypeDescBasis(ITypeDesc** lplptdesc) = 0;
  virtual    BOOL IsConst( ) = 0;
  virtual    BOOL IsVolatile( ) = 0;
  virtual    DWORD GetSize( ) = 0;
  virtual    SCODE GetFuncDesc(IFuncDesc** lplpfdesc) = 0;
  virtual    SCODE GetTypeInfo(ITypeInfo** lplptinfo) = 0;
  virtual    SCODE SetVarType(VARTYPE vt) = 0;
  virtual    SCODE SetTypeDescBasis(ITypeDesc* lptdesc) = 0;
  virtual    SCODE SetConst(BOOL fConst) = 0;
  virtual    SCODE SetVolatile(BOOL fVolatile) = 0;
  virtual    SCODE SetSize(DWORD cbSizeType) = 0;
  virtual    SCODE SetFuncDesc(IFuncDesc* lpfdesc) = 0;
};
```

ITypeDesc Interface

The ITypeDesc interface defines the methods of an ITypeDesc object. An ITypeDesc object defines the type of variable. In a preferred embodiment, an ITypeDesc object defines a fundamental type (e.g., integral type, floating type), and a derived type. Table 6 lists the ITypeDesc interface. A derived type includes directly derived types (e.g., array of variables or objects, functions, pointers to variables or objects, references to objects, constants, pointers to class members) and composed derived types (e.g., classes, structures, unions).

ITypeDesc::GetVarType

The method GetVarType retrieves the variable type of this ITypeDesc object. This method returns the retrieved variable type as its value. The variable type indicates whether this variable is a particular fundamental type, directly derived type, or composed derivative type.

ITypeDesc::GetTypeDescBasis

The method GetTypeDescBasis retrieves an ITypeDesc object that defines the derived type of the variable defined by this ITypeDesc object. The method returns a pointer to the retrieved ITypeDesc as a parameter.

ITypeDesc::IsConst

The method IsConst retrieves a flag that indicates whether the variable defined by this ITypeDesc object is a constant. The method returns the retrieved flag as its value.

ITypeDesc::IsVolatile

The method IsVolatile retrieves a flag that indicates whether the variable defined by this ITypeDesc object is volatile. The method returns the retrieved flag as its value.

ITypeDesc::GetSize

The method GetSize retrieves the size of the variable defined by this ITypeDesc object. The method returns the retrieved size as its value.

ITypeDesc::GetFuncDesc

The method GetFuncDesc retrieves an IFuncDesc object that defines the prototype of the function to which the variable defined by this ITypeDesc object points. The method returns a pointer to the retrieved IFuncDesc as a parameter. If this variable is not a pointer to a function, then the method sets the pointer to NULL.

ITypeDesc::GetTypeInfo

The method GetTypeInfo retrieves an ITypeInfo object that defines the object type of the variable defined by this ITypeDesc object. The method returns a pointer to the retrieved ITypeDesc object. If not applicable, the method sets the pointer to NULL.

ITypeDesc::SetVarType

The method SetVarType stores the variable type of the variable defined by this ITypeDesc object.

ITypeDesc::SetTypeDescBasis

The method SetTypeDescBasis stores the designated ITypeDesc object to describe the derived type of the variable defined by this ITypeDesc object.

ITypeDesc::SetConst

The method SetConst stores the designated flag as the constant flag of the variable defined by for this ITypeDesc object.

ITypeDesc::SetVolatile

The method SetVolatile stores the designated flag as the volatile flag of the variable defined by this ITypeDesc object.

ITypeDesc::Setsize

The method SetSize stores the designated size as the size of the variable defined by this ITypeDesc object. The size is settable only for fixed-length strings. The size can be inferred from all other variable types.

ITypeDesc::SetFuncDesc

The method SetFuncDesc stores the designated IFuncDesc to define the prototype of the function pointed to by the variable defined by this ITypeDesc object.

TABLE 7

```
class IFuncInfo: Public IMemberInfo{
  virtual    SCODE GetFuncDesc(IFuncDesc** lplpfdesc) = 0;
  virtual    BOOL IsProperty( ) = 0;
  virtual    BOOL IsPure( ) = 0;
  virtual    UINT GetOvft( ) = 0;
  virtual    FUNCKIND GetFuncKind( ) = 0;
  virtual    SCODE SetFuncDesc(IFuncDesc* lpfdesc) = 0;
  virtual    SCODE SetProperty(BOOL fProperty) = 0;
  virtual    SCODE SetPure(BOOL fPure) = 0;
  virtual    SCODE SetFuncKind(FUNCKIND fkindFunc) = 0;
};
```

IFuncInfo Interface

The IFuncInfo interface defines the methods of an IFuncInfo object. The IFuncInfo interface inherits the IMemberInfo interface and defines the prototype of a function and binding information of the function. Table 7 lists the IFuncInfo prototype.

IFuncInfo::GetFuncDesc

The method GetFuncDesc retrieves a pointer to an IFuncDesc object that defines the prototype information of the function defined by this IFuncInfo object. The method returns a pointer to the retrieved IFuncDesc as a parameter.

IFuncInfo::GetPropKind

The method GetPropKind retrieves the property kind for the function defined by this IFuncInfo object. The property kind indicates whether this IFuncInfo is a property function, and if it is, the type of property function. A property function is a function that is syntactically invoked in a language in the same way a data member is accessed. The compiler compiles what appears to be data member access to a function member invocation. A property function allows actions to be performed when the property is set. For example, if a paragraph has a justify property, then when the justify property is set to right, not only is a data member set, but also a method is invoked to update the paragraph if displayed. A property function type is either set or get. The method returns the property kind as its value.

IFuncInfo::IsPure

The method IsPure retrieves a flag indicating whether the function defined by this IFuncInfo object is a pure virtual function. The method returns the retrieved flag as its value.

IFuncInfo::GetOvft

The method GetOvft retrieves the offset in the virtual function table of the container object type of the function defined by this IFuncInfo object. If this function is not a virtual function, then an indicator is returned. The offset is set during compilation. The method returns the retrieved offset as its value.

IFuncInfo::GetFuncKind

The method GetFuncKind retrieves the function kind (e.g., virtual, static, etc.) of the function defined by this IFuncInfo object. The method returns the retrieved function kind as its value.

IFuncInfo::SetFuncDesc

The method SetFuncDesc stores the designated IFuncDesc object as the prototype information of the function defined by this IFuncInfo object.

IFuncInfo::SetPropKind

The method SetPropKind stores the designated property kind as a property kind of the function defined by this IFuncInfo object.

IFuncInfo::SetPure

The method SetPure stores the designated flag as the pure flag of the function defined by this IFuncInfo object.

IFunInfo::SetFuncKind

The method SetFuncKind stores the designated function kind as the function kind of the function defined by this IFuncInfo object.

IFuncDesc::GetParamCount

The method GetParamCount retrieves the number of formal parameters of the function defined by this IFuncDesc object. The method returns the number as its value. The number indicates the minimum number of parameters required by this function. Additional parameters are of type variant.

IFuncDesc::GetParam

The method GetParam retrieves an IParamInfo object that defines the formal parameter of the designated index of the function defined by this IFuncDesc object. The method returns the pointer to the IParamInfo object as a parameter.

IFuncDesc::GetCallingConvention

The method GetCallingConvention retrieves the calling convention (e.g., Pascal, C++) of the function defined by this IFuncDesc object. The method returns the retrieved calling convention as its value.

IFuncDesc::GetTypeDescThis

The method GetTypeDescThis retrieves an ITypeDesc object that defines the type of the THIS pointer (e.g., near, far) of the function defined by this IFuncDesc object. The method returns a pointer to the ITypeDesc object as a parameter. If this function is static, the method sets the pointer to NULL.

IFuncDesc::HasAnyNumArgs

The method HasAnyNumArgs retrieves a flag indicating whether the function defined by this IFuncDesc supports a variable number of parameters. The method returns the retrieved flag as its value.

IFuncDesc::GetOptionalArgs

The method GetOptionalArgs retrieves the number of optional parameters that the function defined by this IFuncDesc object supports. The method returns the retrieved number as its value.

IFuncDesc::SetTypeDescResult

The method SetTypeDescResult stores the designated ITypeDesc object as the return type of the function defined by this IFuncDesc object.

TABLE 8

```
interface IFuncDesc{
virtual     SCODE GetTypeDescResult(ITypeDesc** lplptdesc) = 0;
virtual     UINT GetParamCount( ) = 0;
virtual     SCODE GetParam(UINT index, IParamInfo** lplpparaminfo) = 0;
virtual     CALLINGCONVENTION GetCallingConvention( ) = 0;
virtual     SCODE GetTypeDescThis(ITypeDesc** lplptdescThis) = 0;
virtual     BOOL HasAnyNumArgs( ) = 0;
virtual     UINT GetOptionalArgs( ) = 0;
virtual     SCODE SetTypeDescResult(ITypeDesc lptdesc) = 0;
virtual     SCODE AddParam(UINT index, IParaminfo** lpparaminfo) = 0;
virtual     SCODE RemParam(UINT index) = 0;
virtual     SCODE SetCallingConvention(CALLINGCONVENTION ccFunc) = 0;
virtual     SCODE SetTypeDescThis(ITypeDesc* lptdescThis) = 0;
virtual     SCODE SetAnyNumArgs(BOOL hasAnyNumArgs) = 0;
virtual     SCODE SetOptionalArgs(UINT cOptionalArgs) = 0;
};
```

IFuncDesc Interface

The IFuncDesc interface defines the methods of an IFuncInfo object. The IFuncDesc interface provides a mechanism to access function prototype definitions. Table 8 lists the IFuncDesc interface.

IFuncDesc::GetTypeDescResult

The method GetTypeDescResult retrieves an ITypeDesc object that defines the return type of the function defined by this IFuncDesc object. The method returns a pointer to the ITypeDesc object as a parameter.

IFuncDesc::AddParam

The method AddParam adds the designated IParamInfo object before the designated index of parameters of the function defined by this IFuncDesc object. A new parameter may be appended by designating an index equal to the number of parameters presently defined for the function.

IFuncDesc::RemParam

The RemParam removes the formal parameter of the designated index from the formal parameter list of the function defined by this IFuncDesc object.

IFuncDesc::SetCallingConvention

The method SetCallingConvention stores the designated calling convention as a calling convention of the function defined by this IFuncDesc object.

IFuncDesc::SetTypeDescThis

The method SetTypeDescThis stores the designated ITypeDesc object to define the type of the THIS pointer of the function defined by this IFuncDesc object.

IFuncDesc::SetAnyNumArgs

The method SetAnyNumArgs stores the designated number as the number of optional parameters of the function defined by this IFuncDesc object. If the HasAnyNumArgs flag is false, the method returns an error. If the last formal parameter is not an array of variants, the method returns an error.

IFuncDesc::SetOptionalArgs

The method SetOptionalArgs stores the designated number as the number of trailing optional parameters. If the last formal parameter is not a variant, the method returns an error.

TABLE 9

```
class IParaminfo{
virtual    SCODE GetParamName(LPBSTR lpbstrParamName) = 0;
virtual    SCODE GetDocumentation(BSTR* lpbstrDoc) = 0;
virtual    SCODE GetTypeDesc(ITypeDesc** lplptdesc) = 0;
virtual    SCODE SetParamName(LPSTR szName) = 0;
virtual    SCODE SetDocumentation(LPSTR szDoc) = 0;
virtual    SCODE SetTypeDesc(ITypeDesc* lptdesc) = 0;
};
```

IParamInfo Interface

The IParamInfo interface defines the methods of an IParamInfo object. An IParamInfo object provides a mechanism for defining formal parameters. Table 9 lists the IParamInfo interface.

IParamInfo::GetParamName

The method GetParamName retrieves the name of the formal parameter defined by this IParamInfo object. The name is used by languages that support a named parameter call syntax (e.g., ParamB=104). The method returns the retrieved name as a parameter.

IParamInfo::GetDocumentation

The method GetDocumentation retrieves a string containing a description of the formal parameter defined by this IParamInfo object. The retrieved string is returned as a parameter IParamInfo::GetTypeDesc The method GetTypeDesc retrieves the ITypeDesc object that defines the type of the formal parameter defined by this IParamInfo object. The method returns a pointer to the retrieved ITypeDesc object as a parameter.

IParamInfo::SetParamName

The method SetParamName stores the designated name as the name of the formal parameter defined by this IParamInfo object.

IParamInfo::SetDocumentation

The method SetDocumentation stores the designated string as the documentation the formal parameter defined by this IParamInfo object.

IParamInfo::SetTypeDesc

The method SetTypeDesc stores the designated ITypeDesc object to define the type of the formal parameter defined by of this IParamInfo object.

TABLE 10

```
interface ITypeBind{
    virtual    SCODE GetTypeInfoContainer(ITypeInfo** lplptinfoContainer) = 0;
    virtual    UINT GetCbSize( ) = 0;
    virtual    UINT GetAlignment( ) = 0;
    virtual    UINT GetCbSizeVft( ) = 0;
    virtual    SCODE Bind(HGNAM hgnam, KIND* lpbkind, void** lplplIxxxInfo) = 0;
    virtual    SCODE BindProperty (HGNAM hgnam,    IFUncInfo** lplpfinfoGet,
                                                   IFuncInfo** lplpfinfoPut,
                                                   IFuncInfo** lplpfinfoRefPut = 0;
    virtual    SCODE BindType(HGNAM hgnam, ITYPEBIND** lplpitypebind) = 0;
    virtual    BOOL CanCast(ITypeInfo* lptinfoBase) = 0;
    virtual    SCODE GetOverridenFunction(IFuncInfo* lpfinfo, IFuncInfo** lplpfinfoOverridden) = 0;
};
```

ITypeBind Interface

The ITypeBind interface defines the methods of an ITypeBind object. The ITypeBind interface provides a mechanism for compilers to retrieve information needed to compile using the container object type. Compilers invoke methods of an ITypeBind object to bind to an instance of an object of the type defined in the container object type. In a preferred embodiment, the bind names (member names and type names) are represented as handles (hgnam) to a name table. In this way, bind names can be efficiently identified during binding by the handle rather than by using a string. A compiler converts each bind name to a name handle before invoking the methods of the ITypeBind interface. The type library may supply a global function for this conversion. Table 10 lists the ITypeBind interface.

ITypeBind::GetTypeInfoContainer

The method GetTypeInfoContainer retrieves an ITypeInfo object defining the container object type of this ITypeBind object. The method returns a pointer to the retrieved ITypeInfo object as a parameter.

ITypeBind::GetCbSize

The GetCbSize method retrieves the size of an object of the object type defined by this ITypeBind object. This size is the size of the instance data. The method returns the retrieved size as its value.

ITypeBind::GetAlignment

The method GetAlignment retrieves the alignment for embedded objects of the container object type of this ITypeBind object. The method returns the alignment as its value.

ITypeBind::GetCbSizeVft

The method GetCbSizeVft retrieves the size of the virtual function table for the container object type of this ITypeBind object. The method returns the retrieved size as its value.

ITypeBind::Bind

The method Bind retrieves an IVarInfo or IFuncInfo object that defines the member matching the designated name handle within the container type defined by this ITypeBind object. The method returns an indication whether the member is a property. If the member is a property, then the BindProperty method should be invoked next. The method returns a pointer to the IVarInfo or IFuncInfo object as a parameter.
ITypeBind::BindProperty The method BindProperty retrieves an IFuncInfo object defining a get property function and a put property function of the member matching the designated name handle of the container object type of this ITypeBind object. The method returns pointers to the IFuncInfo objects.
ITypeBind::BindType The method BindType retrieves an ITypeBind object which defines the type matching the designated type name. This method is invoked on the ITypeBind object returned by the method ITypeLib::GetTypeBind to bind to types defined within that library. The method is also used to bind to nested types.
ITypeBind::CanCast The method CanCast retrieves an ITypeInfo object defining the base member of the container object type of this ITypeBind object. In an alternate embodiment, an array of ITypeBind objects is retrieved to accommodate multiple inheritance. The method returns a pointer to the retrieved ITypeBind instance.
ITypeBind::GetOverridenFunction The method GetOverridenFunction retrieves an IFuncInfo object that defines a virtual function member whose prototype is identical to the function defined by the designated IFuncInfo object that defines a function member of the container object type of the this ITypeBind object. The method returns a pointer to the retrieved IFuncInfo object as a parameter.

interface objects. For example, the function CreateITypeDesc creates an uninitialized ITypeDesc object and returns a pointer to the object. These functions, except for the function to open a library, can be defined as global functions within the type library.
Continuing Example Code Tables 2 through 5 list pseudocode that shows the adding of a class definition to a type library. Code Table 2 lists pseudocode for the routine AddClass. The routine AddClass is passed a pointer to an ITypeLib object into which a designated $class_{13}$ definition is to be added. In line 2, the routine invokes routine GenerateClassTypeInfo passing the designated class definition. The routine GenerateClassTypeInfo returns an ITypeInfo object that is initialized with the designated class definition. In line 3, the routine adds the ITypeInfo object to the designated ITypeLib object.

CODE TABLE 2

| | |
|---|---|
| 1 | AddClass(definition, ptlib); |
| 2 | {GenerateClassTypeInfo(class_definition, ptinfo); |
| 3 | ptlib->AddTypeInfo(ptinfo); |
| | }; |

Code Table 3 lists pseudocode for the routine GenerateClassTypeInfo. The routine GenerateClassTypeInfo is passed a class definition (e.g., name, member names), instantiates all objects needed to describe the class, and returns an ITypeInfo object defining the class. In line 2, the routine invokes routine CreateTypeInfo to instantiate an uninitialized ITypeInfo object. In line 3, 4, and 5, the routine sets various attributes of the class. Other attributes of the

TABLE 11

```
class TypeFixups{
    virtual    SCODE GetTypeInfoContainer(ITypeInfo** lplptinfoContainer) = 0;
    virtual    UINT AddressofMember(HMEMBER hmember, VOID** lplpvoid) = 0;
};
```

ITypeFixups Interface

The ITypeFixups interface defines the methods of an ITypeFixups object. The ITypeFixups interface provides a mechanism for loaders to retrieve the address of static function members, static data members, and global functions and data. Table 11 lists the ITypeFixups interface.
ITypeFixups::GetTypeInfoContainer The method GetTypeInfoContainer retrieves an ITypeInfo object that defines the container object type of this ITypeFixups object. The method returns a pointer to the retrieved ITypeInfo object as a parameter.
ITypeFixups::AddressOfMember The method AddressOfMember retrieves the address of the designated member of the container object type of this ITypeFixups object. If the designated member is a static function member or a global function, the method loads the code implementing the function from a dynamic link library. In an alternate embodiment, all static function members and global functions could be loaded when the type library is first opened. Also, the functions could be stored directly in the type library rather than in a separated dynamic link library. The method returns the address as its value.
Auxiliary Function The present invention provides various auxiliary functions. The auxiliary functions provide a mechanism for an application to open a type library and instantiate various class could be set including documentation, help file, etc. In line 6, the routine invokes method GetTypeMembers to retrieve an uninitialized ITypeMembers object. In lines 7 through 10, 11 through 14, and 15 through 18, the routine adds the definition of data member, function member, and base members to the ITypeMembers object. In the following, the steps of adding the description of data members is described. One skilled in the art would appreciate that the description of adding function members and base members is analogous. In lines 7 through 10, the routine adds the definition of all the data members of the class to the ITypeMembers. In line 7, the routine initializes the variable i, which is used to index the data members. In lines 8 through 10, the routine loop added the definition of each data member. In line 9, the routine invokes the routine GenerateDataInfo passing in the data member definition and the ITypeInfo object. The routine GenerateDataInfo returns an IVarInfo object containing the definition of the data member. In line 10, the routine adds the IVarInfo object to the ITypeMembers object.

CODE TABLE 3

```
1   GenerateClassTypeInfo (class_definition, ptinfo)
2   {CreateTypeInfo(ptinfo);
3   ptinfo->SetName(name);
4   ptinfo->SetTypeKind(CLASS);
5   ptinfo->SetAlignment(alignment);
6   ptinfo->GetTypeMembers(ptmembers);
7   i = 0;
8   for (each data member)
9     {GenerateDataInfo(datainfo, pvinfo);
10    ptmembers->Addvar(i++, pvinfo)};
11  i = 0;
12  for (each function member)
13    {GenerateFuncInfo(funcinfo, pfinfo);
14    ptmembers->AddFunc(i++, pfinfo)};
15  i = 0;
16  for (each base class)
17    {GenerateBaseInfo(baseinfo, pvinfo);
18    ptmembers->AddBase(i++, pvinfo)};
    }
```

Code Table 4 lists pseudocode for the routine GenerateDataInfo. The routine GenerateDataInfo is passed information defining a data member, generates an IVarInfo object defining the data member, and returns the IVarInfo object. In line 2, the routine invokes routine CreateVarInfo, which creates an uninitialized IVarInfo object. In line 5, the routine sets the name of the IVarInfo instance to the data member name. In line 6, the routine invokes routine GenerateTypeDesc to create and initialize an ITypeDesc instance for the designated data member. In line 7, the routine stores the pointer to the ITypeDesc instance in the IVarInfo instance. In lines 8 and 9, the routine sets various attributes of the data member.

CODE TABLE 4

```
1   GenerateDataInfo (varinfo, pvinfo)
2   {CreateVarInfo(pvinfo);
3   \*;
4   set variable kind to data member;
5   pvinfo->SetName(data member name);
6   GenerateTypeDesc(typedesc, ptdesc);
7   pvinfo->SetTypeDesc(ptdesc);
8   if (variable is static) pvinfo->SetStatic(true);
9   if (variable is constant) pvinfo->SetVal(constant
        value);
    }
```

Code Table 5 lists pseudocode for the routine GenerateTypeDesc. The routine GenerateTypeDesc is passed a type definition and an ITypeInfo object, creates and initializes an ITypeDesc object, and returns the ITypeDesc object. In line 2, the routine invokes routine CreateTypeDesc to create an uninitialized ITypeDesc object. In line 3, the routine sets a pointer to an ITypeInfo object. In line 4, the routine sets the variable kind of the ITypeDesc object. In lines 4 through 6, if the variable is a derived type, then the routine generates an ITypeDesc object for the derived from type by recursively calling routine GenerateTypeDesc and stores a pointer to the ITypeDesc object for the derived type. In lines 7 through 11, the routine sets various attributes and creates and initializes an IFuncDesc instance when the variable points to a function.

CODE TABLE 5

```
1   GenerateTypeDesc(typedesc, ptdesc);
2   {createTypeDesc(ptdesc);
3   ptdesc->SetVarType(variabletype);
4   if (type has basis)
5     {GenerateTypeDesc(typedesc_of_basis,
            ptdesc_for_basis);
6     ptdesc->SetTypeDescBasis (ptdescforbasis)};
7   if (type is constant) ptdesc->SetConst(true);
8   if (type is volatile) ptdesc->SetVolatile(true);
9   if (type is pointer to function)
10    {GenerateFuncDesc(functionname, pfdesc);
11         ptdesc->SetFuncDesc(pfdesc)};
    }
```

Figure 8:
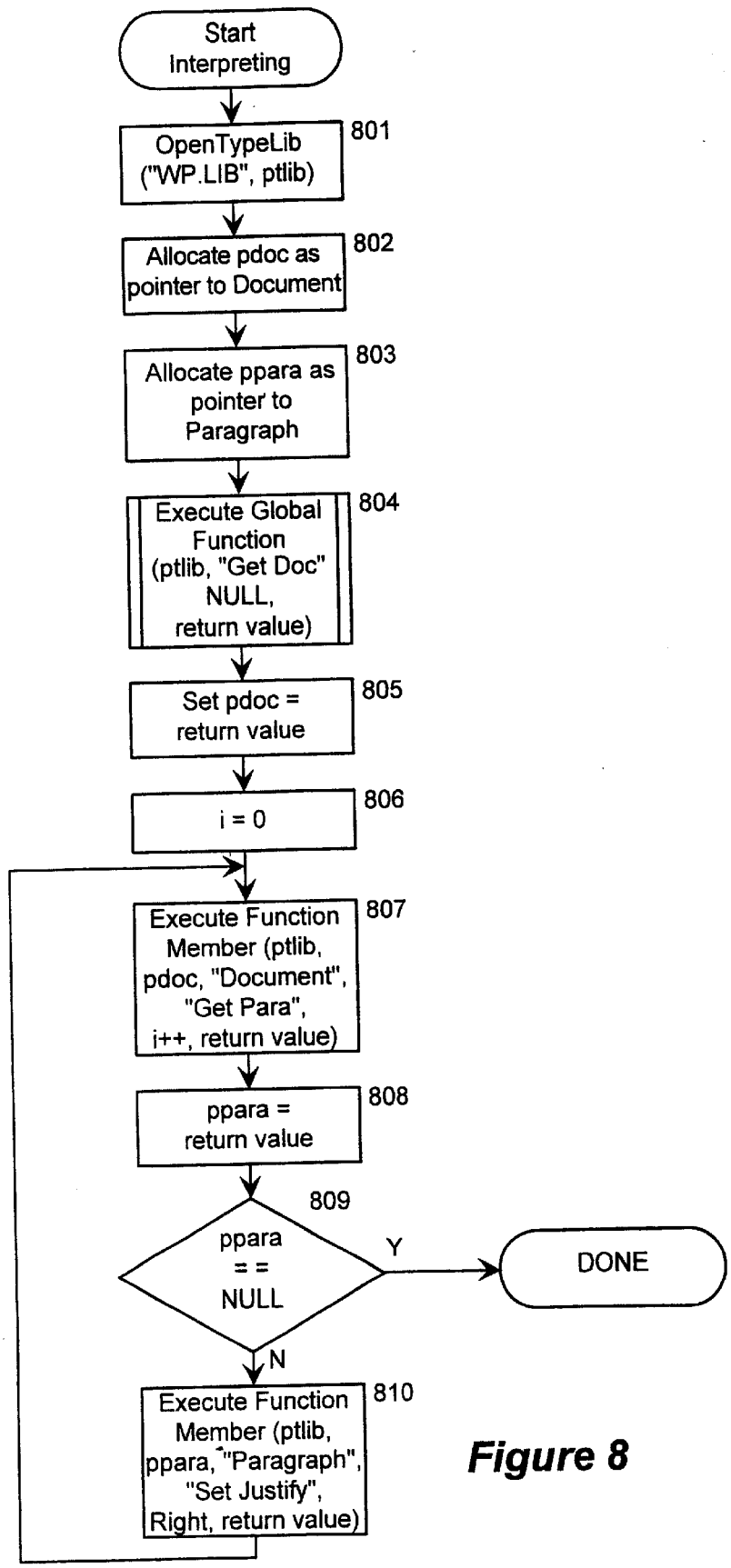
FIG. 8 is a diagram showing steps a macro interpreter executes when interpreting the macro of Code Table 1.

FIG. 8 is a diagram showing steps the macro interpreter executes to interpret the macro of Code Table 1. FIG. 8 does not represent a flow diagram of the macro interpreter, but rather represents those steps the macro interpreter executes when interpreting the macro of Code Table 1. In step 801, the macro interpreter opens the type library for the word processor. When the type library is opened, a pointer to an ITypeLib object is returned in variable ptlib. In step 802, the macro interpreter allocates memory for the variable pdoc, which is a pointer to a document type. In step 803, the macro interpreter allocates memory for the variable ppara which is a pointer to a paragraph type. In step 804, the macro interpreter interprets line 3 of Code Table 1. The macro interpreter invokes its routine ExecuteGlobalFunction passing it a pointer to the open type library, the name of the global function GetDoc, and an indication that there are no parameters. The routine returns as its value a pointer to the document object for the open document in the word processor. In step 805, the macro interpreter sets the variable pdoc to the return value. In step 806, the macro interpreter interprets line 4 of Code Table 1.The macro interpreter sets the variable i to 0. In steps 807 through 810, the macro interpreter interprets lines 5 and 6 of Code Table 1. In step 807, the macro interpreter invokes the routine ExecuteMemberFunction passing a pointer to the ITypeLib object for the open library, a pointer to the document object, an indication that the pointer is to the document object type, the name of the function member to execute (GetPara), and an indication of the number of parameters. The routine returns the result of the GetPara function member. The GetPara function member returns a pointer to a paragraph object of the designated index. In step 808, the macro interpreter sets variable ppara equal to the return value. In step 809, if the variable ppara is equal to null, then all the paragraphs have been processed and the macro interpreter is done interpreting the Code Table 1, else the macro interpreter continues at step 810. In step 810, the macro interpreter invokes routine ExecuteFunctionMember passing a pointer to the ITypeLib object for the open library, a pointer to the paragraph object, an indication that the pointer to the paragraph object points to a paragraph, the name of the function member of the paragraph object to execute (SetJustify), and the parameter "right." The function member SetJustify has no return value. The macro interpreter then loops to step 807 to continue execution of the loop of lines 5 and 6 of Code Table 1.

Figure 9:
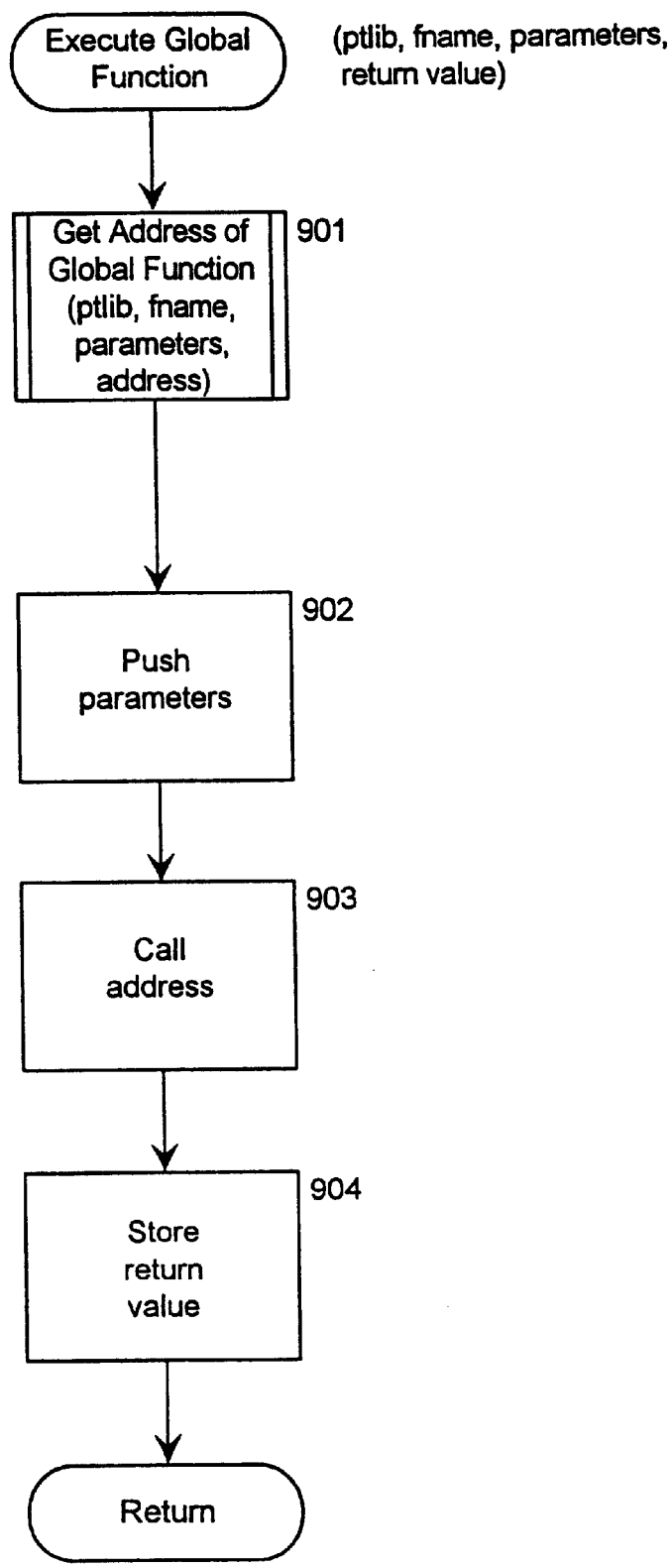
FIG. 9 is a flow diagram of the routine ExecuteGlobalFunction.

FIG. 9 is a flow diagram of the routine ExecuteGlobalFunction. This routine determines the address of a global function, pushes the parameters for that global function, invokes the global function, and returns the value of the global function. This routine is passed a pointer to an ITypeLib, the name of the global function to execute, and the parameters for the function. This routine returns the value of the global function. In step 901, the routine invokes routine GetAddressOfGlobalFunction passing it a pointer to the ITypeLib object, the function name, and the parameters. The routine GetAddressOfGlobalFunction returns the address of the global function of the designated name within the word processing program. In step 902, the routine pushes the parameters. The step of pushing the parameters would depend upon the calling convention of the global function. In step 903, the routine invokes the global function. In step 904, the routine stores the value of the global function as the return value and returns itself.

Figure 10:
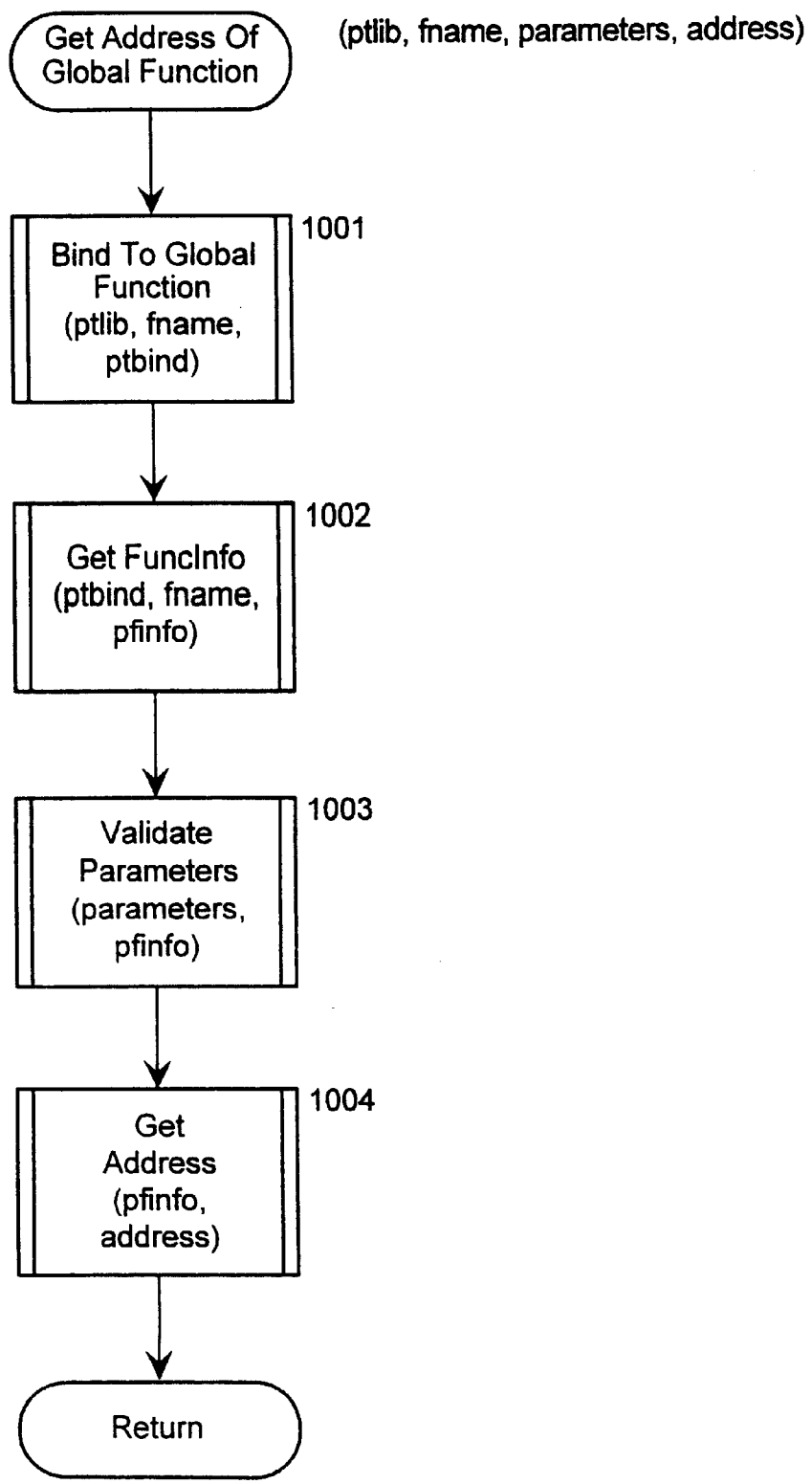
FIG. 10 is a flow diagram of the routine GetAddressOfGlobalFunction.

FIG. 10 is a flow diagram of the routine GetAddressOfGlobalFunction. Routine GetAddressOfGlobalFunction accesses the type library to determine the address of the designated global function. The routine is passed a pointer to an ITypeLib object, the name of the global function, and the parameters to pass to the global function. The routine returns the address of the global function. In step 1001, the routine invokes routine BindToGlobalFunction passing it the pointer to the ITypeLib object and the name of the global function. The BindToGlobalFunction routine returns a pointer to an ITypeBind object for the designated global function. In step 1002, the routine invokes routine GetFuncInfo passing it the pointer to the ITypeBind object. The routine GetFuncInfo returns a pointer to an IFuncInfo object for the global function. In step 1003, the routine invokes routine ValidateParameters passing it the parameters and the pointer to the IFuncInfo object. The ValidateParameters routine determines whether the designated parameters are consistent with the formal parameters specified in the IFuncInfo object. In step 1004, the routine invokes routine GetAddress passing it the pointer to the IFuncInfo object. The routine GetAddress returns the address corresponding to the IFuncInfo object. The GetAddressOfGlobalFunction routine then returns.

Code Table 6 lists pseudocode for the routine BindToGlobalFunction. The routine BindToGlobalFunction inputs a pointer an ITypeLib object and the name of a global function. The routine retrieves an ITypeBind object for the designated function and returns a pointer to that object. The routine retrieves the ITypeBind object by searching through each ITypeInfo object within the type library that has a type kind of MODULE. The routine checks each function within the ITypeInfo object to determine whether it matches the designated name. If it matches the designated name, then the routine retrieves an ITypeBind object for that function and returns. In an alternate embodiment, the method ITypeLib::GetTypeBind() can be used to retrieve an ITypeBind instance through which the ITypeBind object for the global function of the designated name can be retrieved. Also, in an alternate embodiment, the routine BindToGlobalFunction would check to determine whether multiple global functions with the designated name were defined, rather than return when the first global function was found.

CODE TABLE 6

```
1  BindToGlobalFunction (ptlib, fname, pbind)
2  {count = ptlib->GetTypeInfoCount( );
3   for (i = 0; i < count; i++)
4     {ptlib->GetTypeInfo(i, ptinfo);
5      if ptinfo->GetTypeKind( ) == MODULE
6        {ptinfo->GetTypeMembers(ptmembers);
7         fcount = ptmembers->GetFuncCount( );
8         for (j = 0; j < fcount; j++)
```

CODE TABLE 6-continued

```
9           {ptmembers->GetFunc(j, pfinfo);
10           pfinfo->GetName(name);
11           if fname == name
12             {ptinfo->GetTypeBind(&ptbind);
13              return}}}};
   }
```

Code Table 7 lists pseudocode for the routine GetFuncInfo. The routine GetFuncInfo is passed a pointer to an ITypeBind object and the name of a function to bind. The routine returns a pointer to an IFuncInfo object for the designated function.

CODE TABLE 7

```
1  GetFuncInfo(ptbind, fname, pfinfo);
2  {ptbind->Bind(fname, BINDKIND_FUNCTION, pfinfo);
   }
```

Code Table 8 lists pseudocode for the routine ValidateParameters. This routine receives a list of parameters and a pointer to an IFuncInfo object. The routine determines if the designated parameters are consistent with the formal parameters of the IFuncInfo instance. The routine returns as its value an indication of whether the parameters match.

CODE TABLE 8

```
1  ValidateParameters(parameters, pfinfo)
2  {pfinfo->GetFuncDesc(pfdesc);
3   for ( i = 0; i < pfdesc->GetParamCount( ); i++)
4     {pfdesc->GetParam(i, &ppinfo);
5      ppinfo->GetTypeDesc(ptdesc);
6      Determine if parameters[i] matches type
           pointed to by ptdesc
7      if (!match) {return error}};
   }
```

Code Table 9 lists pseudocode for the routine GetAddress. The routine receives a pointer to an IFuncInfo object and returns the address of the function defined by that object. The routine retrieves a handle for that member and then uses an ITypeFixups object to retrieve the address.

CODE TABLE 9

```
1  GetAddress (pfinfo, address)
2  {Hmember = pfinfo->GetHmember( );
3   pfinfo->GetTypeInfoContainer(ptinfo);
4   ptinfo->GetTypeFixups(ptfixups);
5   address = ptfixups->AddressOfMember(Hmember);
   }
```

Figure 11:
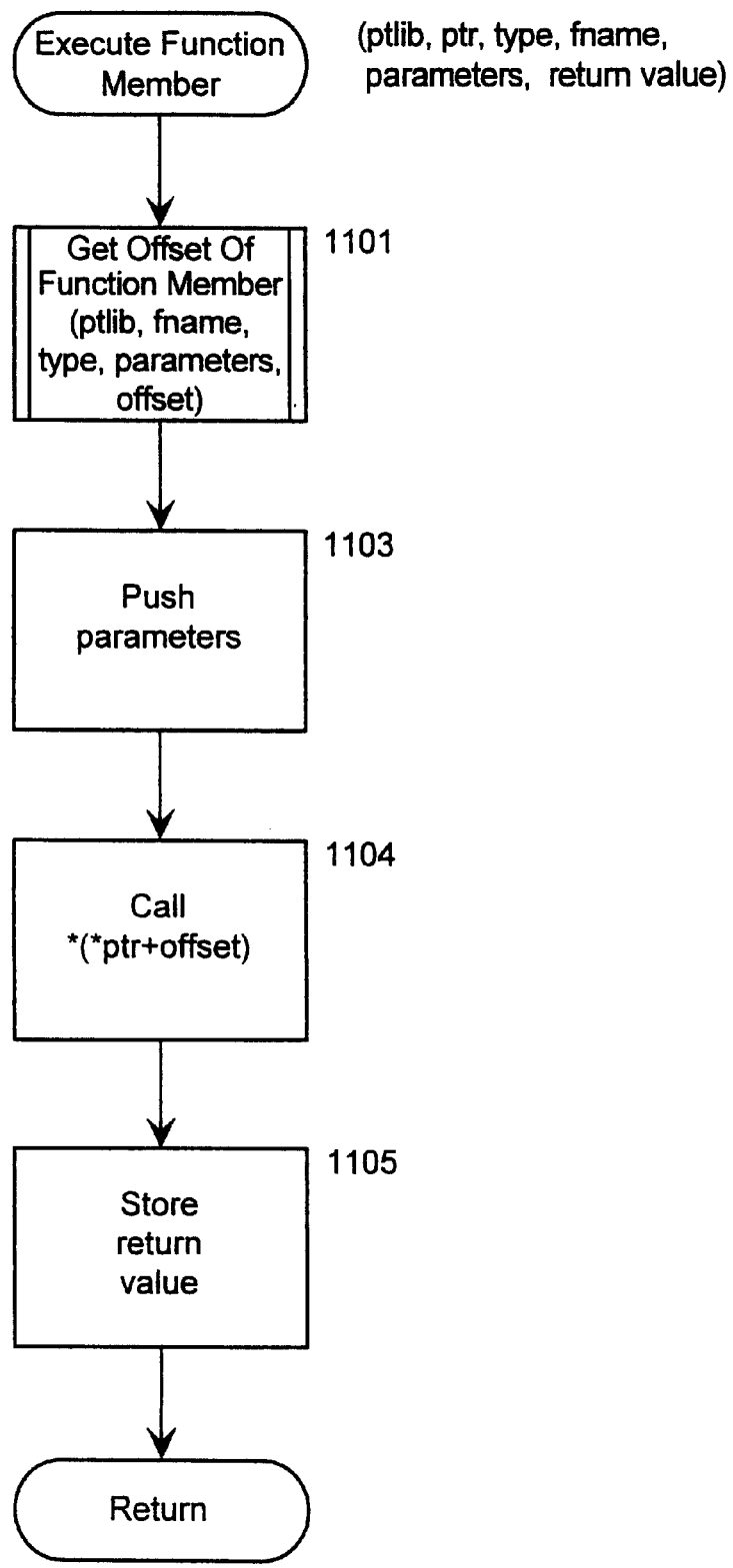
FIG. 11 is a flow diagram of the routine ExecuteFunctionMember.

FIG. 11 is a flow diagram of the routine ExecuteFunctionMember. This routine is passed a pointer to an ITypeLib object, a pointer to an object, the type of the object, the name of a function member, and the parameters to pass to the function member. The routine determines the offset of the function member within the virtual function table of the designated object, invokes that function passing it the parameters, and returns the value of the designated function. In step 1101, the routine invokes routine GetOffsetOfFunctionMember passing it the pointer to the ITypeLib object, the name of the designated function, the object type of which the designated function is a member, and the parameters for the designated function. The GetOffsetOfFunctionMember returns the offset of the designated function member within the virtual function table of the designated object type. In step 1103, the routine pushes the parameters. In step 1104, the routine invokes the designated function of the designated object. In step 1105, the routine stores the return value of the designated function. The routine ExecuteFunctionMember then returns.

Figure 12:
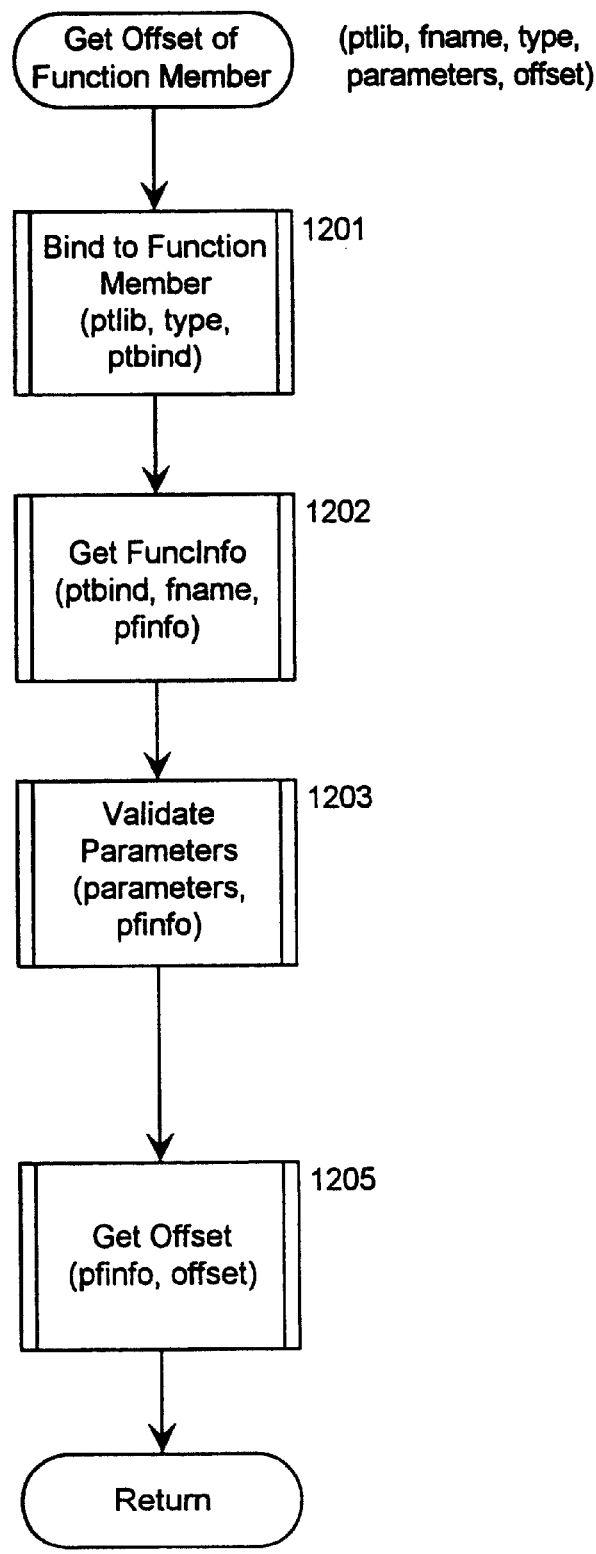
FIG. 12 is a flow diagram of the routine GetOffsetOfFunctionMember.

FIG. 12 is a flow diagram of the routine GetOffsetOfFunctionMember. The routine inputs a pointer to an ITypeLib object, the name of a function member, the container object type of the function member, and parameters to be passed to the function member. The routine validates the parameters and returns the offset of the designated function member in the virtual function table of the container object type. In step 1201, the routine invokes routine BindToFunctionMember passing it pointer to the designated ITypeLib object and the designated container object type. The routine returns with a pointer to an ITypeBind object for the designated container object type. In step 1202, the routine invokes routine GetFuncInfo passing it a pointer to the designated ITypeInfo object and the name of the designated function member. The routine returns a pointer to an IFuncInfo object for the designated function. In step 1203, the routine invokes the routine ValidateParameters passing it the designated parameters and the pointer to the IFuncInfo object for the designated function member. In step 1205, the routine invokes routine GetOffset passing it the pointer to the IFuncInfo object for the designated function member. The routine GetOffset returns the offset of the designated function member within the virtual function table of the container object type. The routine GetOffset then returns.

Code Table 10 lists pseudocode for the routine BindToFunctionMember. The routine BindToFunctionMember is passed a pointer to an ITypeLib object and the name of the container object type. The routine returns a pointer to an ITypeBind object for the designated container object type.

CODE TABLE 10

| | |
|---|---|
| 1 | BindToFunctionMember(ptlib, type, ptbind) |
| 2 | {ptlib->GetIndexOfName(type, index); |
| 3 | ptlib->GetTypeInfo(index, ptinfo); |
| 4 | ptinf->GetTypeBind(ptbind); |
| | } |

Code Table 11 lists pseudocode for the routine GetOffset. The routine GetOffset is passed an IFuncInfo object and returns the offset of the function member defined by the designated IFuncInfo object.

CODE TABLE 11

| | |
|---|---|
| 1 | GetOffset(pfinfo, offset) |
| 2 | {offset = pfinfo->GetOvft( ); |
| | } |

One skilled in the art would appreciate that the type library interfaces as specified in this embodiment support classes defined with at most one base class. Instances of classes that inherit only one base class are preferably laid out with a single virtual function table. The instance contains a pointer to the virtual function table that is a known offset within the object.

In an alternate embodiment, multiple inheritance is supported. To support multiple inheritance, additional methods are included in several interfaces. In particular, the ITypeMembers interface includes methods to add, remove, and get information describing a base class. The IVarInfo interface includes a method to retrieve the offset (within an instance of an object defined by the container type) of the introducing base class (possibly virtually inherited) of the base class defined by the IVarInfo object. The IFuncInfo interface includes a method to retrieve the offset (within an instance of an object defined by the container type) of the pointer to the virtual function table containing the address of the function defined by the IFuncInfo object. The ITypeBind interface includes a method to provide information on how to cast an instance of an object defined by the container type to an instance of a base class.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

What is claimed is:

1. A computer system for a client program to access an object instantiated by a server program, the object having a type, the computer system having a type library, the type library including information defining the type of the object, the object having a data member and a function member, the information defining the object including type of the data member of the object and type of the function member of the object, the computer system comprising:

means within the server program for instantiating the object; and means within the client program for retrieving from the type library information defining the type of the instantiated object;

invoking a function of the server program to retrieve an address of the instantiated object; and invoking the function member of the instantiated object using the retrieved information and retrieved address of the instantiated object.

2. The computer system of claim 1 including means for loading the client program into an address space of the server program.

3. The computer system of claim 1 including means for loading the client program into an address space that is separate from the address space of the server program.

4. The computer system of claim 1 including means within the client program for receiving from a user of the computer system an indication of the type of the instantiated object and an indication of the function member to invoke.

5. A method in a computer system of accessing an object by a client computer program, the object having an object type, a data member, and a function member, and being instantiated by a server computer program, the method comprising the steps of:

generating a type library containing a definition of the object type and a function that returns a pointer to the instantiated object, the definition of the object type including type of the data member of the object and type of the function member of the object;

executing the server computer program, wherein the server computer program instantiates an object of the object type, the instantiated object having a location; and executing the client computer program, wherein the client computer program,
- determines the definition of the object type of the instantiated object using the generated type library;
- identifies the function to invoke to retrieve the location of the instantiated object, the function being contained in the generated type library; and
- accesses the object by using the determined definition and by invoking the identified function member to retrieve the location of the instantiated object.

6. The method of claim 5 wherein the step of determining the location of the function includes the step of loading the function in the computer system.

7. A method in a computer system for providing information about objects of user-defined types instantiated in a first computer program to a second computer program at run time, the information including type information, binding information, and loading information, the information provided to the second computer program so that the second computer program can directly access the objects instantiated in the first computer program, the type information including types of data members of the objects and types of function members of the objects, the method comprising the steps of:
- loading an implementation of a type library interface into the memory of the computer system from within a third computer program;
- invoking type library interface functions within the third computer program to store in a type library type, binding, and loading information about objects to be instantiated in the first computer program;
- starting execution of the first computer program;
- starting execution of the second computer program;
- instantiating objects within the fist computer program, the objects having their type, binding, and loading information stored in the type library;
- loading the type library interface into the memory of the computer system from within the second computer program;
- invoking type library interface functions within the second computer program to retrieve the type, binding, and loading information about objects instantiated in the first computer program stored in the type library; and
- using the retrieved type, binding, and loading information to access objects instantiated in the first computer program from within the second computer program.

8. The method of claim 7 wherein the step of invoking type library interface functions within the third computer program to store type, binding, and loading information about objects to be instantiated in the first computer program comprises invoking function members of the type library object and of objects directly or indirectly referenced by the type library object data members to store the type, binding, and loading information in type library object data members and in data members of objects directly or indirectly referenced by the type library object data members.

9. A computer-readable medium containing instructions for causing a computer system to provide information about objects of user-defined types instantiated in a first computer program to a second computer program at run time, the information including type information, binding information, and loading information, the information provided to the second computer program so that the second computer program can directly access the objects instantiated in the first computer program, the type information including types of data members of the objects and types of function members of the objects, by:
- loading an implementation of a type library interface into the memory of the computer system from within a third computer program;
- invoking type library interface functions within the third computer program to store in a type library type, binding, and loading information about objects to be instantiated in the first computer program;
- starting execution of the first computer program;
- starting execution of the second computer program;
- instantiating objects within the first computer program, the objects having their type, binding, and loading information stored in the type library;
- loading the type library interface into the memory of the computer system from within the second computer program;
- invoking type library interface functions within the second computer program to retrieve the type, binding, and loading information about objects instantiated in the first computer program stored in the type library; and
- using the retrieved type, binding, and loading information to access objects instantiated in the first computer program from within the second computer program.

10. The computer-readable medium of claim 9 wherein the invoking of type library interface functions within the third computer program to store type, binding, and loading information about objects to be instantiated in the first computer program comprises invoking function members of the type library object and of objects directly or indirectly referenced by the type library object data members to store the type, binding, and loading information in type library object data members and in data members of objects directly or indirectly referenced by the type library object data members.

* * * * *